(12) United States Patent
Freeman et al.

(10) Patent No.: US 10,176,527 B1
(45) Date of Patent: Jan. 8, 2019

(54) PROVIDING SHADE FOR OPTICAL DETECTION OF STRUCTURAL FEATURES

(71) Applicant: STATE FARM MUTUAL AUTOMOBILE INSURANCE COMPANY, Bloomington, IL (US)

(72) Inventors: James M. Freeman, Normal, IL (US); Patrick H. Boyer, Bloomington, IL (US); Nicholas U. Christopulos, Bloomington, IL (US); Jonathan D. Maurer, Bloomington, IL (US); Nathan L. Tofte, Downs, IL (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 281 days.

(21) Appl. No.: 15/140,226

(22) Filed: Apr. 27, 2016

(51) Int. Cl.
*G06Q 40/08* (2012.01)
*G06T 7/00* (2017.01)
*G02F 1/01* (2006.01)
*H04N 13/211* (2018.01)
*H04N 13/254* (2018.01)

(52) U.S. Cl.
CPC .......... *G06Q 40/08* (2013.01); *G02F 1/0121* (2013.01); *G06T 7/0057* (2013.01); *H04N 13/211* (2018.05); *H04N 13/254* (2018.05)

(58) Field of Classification Search
CPC ................................ G01B 11/14; G06K 9/00
See application file for complete search history.

(56) References Cited

U.S. PATENT DOCUMENTS

| | | | |
|---|---|---|---|
| 2009/0268214 A1* | 10/2009 | Lucic | G01B 11/25 356/614 |
| 2010/0079974 A1* | 4/2010 | Kruger | G03B 15/02 362/8 |

OTHER PUBLICATIONS

"Low-cost 3d Laser Scanner and fast Surface Registration," http://www.rob.cs.tu-bs.de/en/news/david, retrieved Dec. 25, 2015.
"3D Scanning 101 -Desktop Engineering," http://www.deskeng.com/de/3d-scanning-101, retrieved on Dec. 25, 2015.

* cited by examiner

*Primary Examiner* — Luke D Ratcliffe
(74) *Attorney, Agent, or Firm* — Marshall, Gerstein & Borun LLP; Randall G. Rueth

(57) ABSTRACT

A shading system creates a shaded region on a structure, enabling 3D scanning techniques that rely on light detection to generate a 3D model. The shading system includes a vehicle or device that moves the shading system into place. A light, such as a laser dot or line, can be projected onto the shaded region of the structure and detected by a 3D scanner.

16 Claims, 14 Drawing Sheets

US 10,176,527 B1

PROVIDING SHADE FOR OPTICAL DETECTION OF STRUCTURAL FEATURES

TECHNICAL FIELD

This disclosure relates to techniques for providing shade to facilitate optical detection of structural features.

BACKGROUND

Determining and documenting the extent of damage to a structure can be risky for the person determining the damage. For example, in a situation where a structure has experienced roof damage, someone typically climbs onto the roof to evaluate the damage. Once on the roof, he or she may sketch the damaged area of the roof in order to document the damage. In the alternative, he or she might take a digital picture of the damaged area. Afterwards, the picture might be analyzed by someone to estimate the extent of damage to the structure. In either scenario, the person has exposed himself or herself to a risk of falling.

Further, pictures or video of a roof or structure often provide inadequate detail for thorough inspection. Poor image quality resulting from camera movement or an out-of-focus image can make it difficult to estimate the condition of a structure based on the image. Even where image quality is adequate, poor angles or bad lighting may hide or exaggerate details important to estimating the condition of the structure, leading to inaccurate assessments of the structure's condition.

SUMMARY

The shading systems and techniques described below enable three-dimensional (3D) scanning of a structure during the day when bright light from the sun might otherwise make light-based 3D scanning techniques impractical. By blocking the sun to create a shaded region on a structure, edges or borders between the shaded region and sunlight may be detected by a 3D scanner in an embodiment. In an embodiment, light may be projected within the shaded region and detected by a 3D scanner. The 3D models generated by way of this 3D scanning can be analyzed to evaluate the condition of the structure, removing the need to have a person visually inspect the structure in person.

DETAILED DESCRIPTION

Determining and documenting the extent of damage to a structure can be risky for the person determining the damage. To eliminate this risk, one can analyze a three-dimensional (3D) model of the structure (e.g., generated by one of 3D scanners described below) rather than the structure itself. As described below, many 3D model generation techniques rely on projecting and detecting a light. For example, time-of-flight techniques rely on projecting multiple laser dots, detecting the projected laser dots, and measuring each round-trip time for the projected laser dots to estimate the distance from the sensor to the small area reflecting the laser dot. By accumulating enough of these distance measurements, a 3D model of the structure can be constructed.

Unfortunately, many structures (e.g., houses) that one might wish to model exist outdoors. Due to bright light from the sun, image sensors often struggle to detect light projected onto these outdoor structures. Thus, one is often left with the option of scanning a structure at night (which can be troublesome for a number of reasons) or simply not scanning a structure and instead sending a person to the structure to visually inspect for damage. The shading systems and techniques described below address this day-time 3D scanning problem. By blocking the sun and creating a shaded region on a structure, light can be projected within the shaded region and detected by a 3D scanner. In an embodiment, blocking the sun and creating the shaded region may be sufficient for 3D scanning purposes, even without projecting a light. For example, a defining edge between the suns direct rays and the shaded region may be enough to analyze and determine distance measurements (e.g., depth) of scanned features (e.g., dents or cracks on a roof). Thus, the 3D scanning techniques described herein can be performed during the day when bright light from the sun might otherwise make light-based 3D scanning techniques impractical.

I. Overview

Figure 1A:
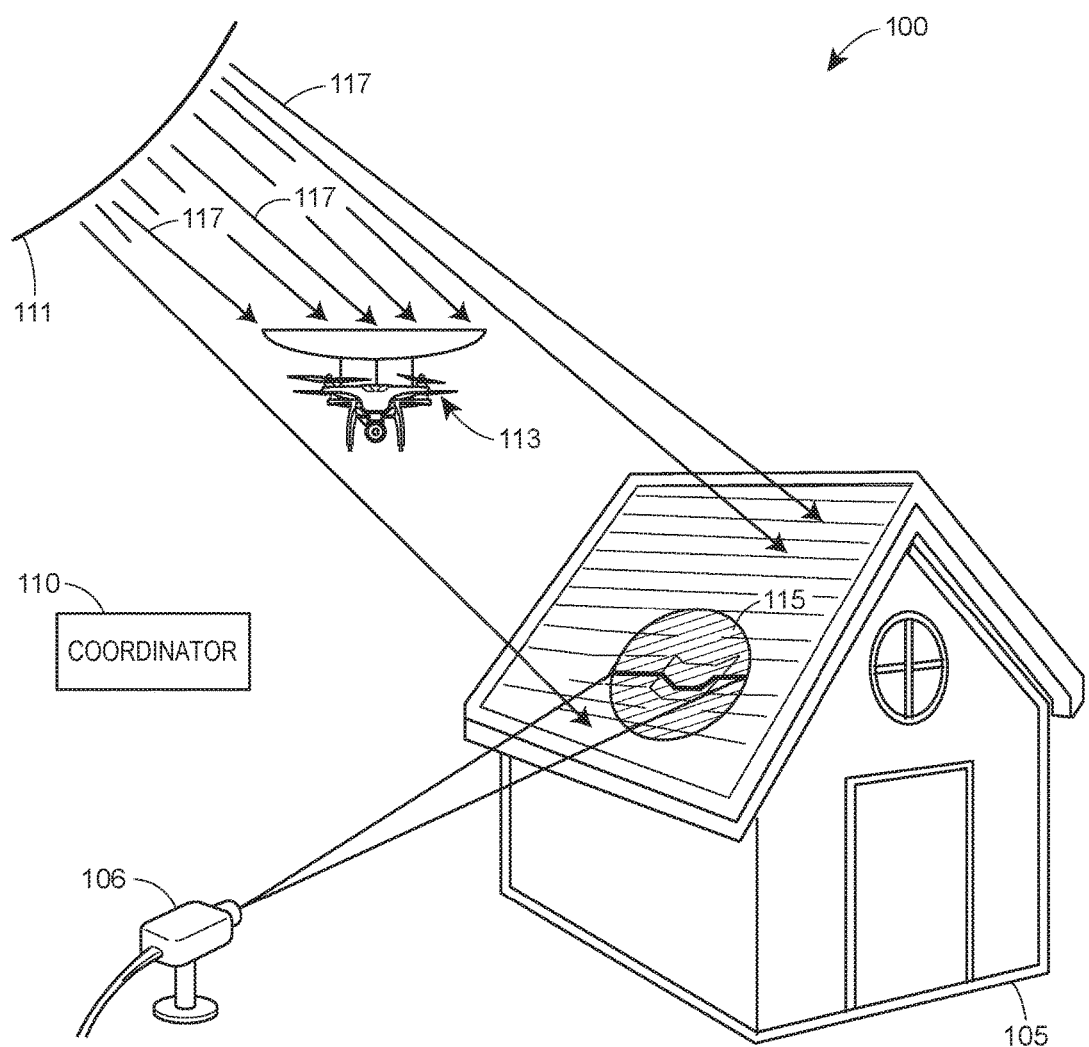
FIG. 1A illustrates a block diagram of a system including property inspection system according to an embodiment.

FIG. 1A illustrates a block diagram of a system 100 including a property inspection system 106 according to an embodiment. The property inspection system 106 is configured to inspect a structure 105. A shading system 113 may block light 117 from the sun 111 to create a shaded region 115 on the structure 105. The shading system 113 facilitates 3D scanning techniques that rely on light detection to generate a 3D model. While a laser or light pattern projected onto the structure 105 may be difficult to detect during the day when sunlight is present, for example, the shading system 113 can be positioned to create the shaded region 115 where projected light (e.g., white light or lasers projected from the property inspection system 106) can more easily be detected. Depending on the embodiment, the shaded region 115 may be comprised of polarized, colored, or mechanically altered light (e.g., slots, diamond designs, etc) to enhance the ability to detect a delta between an expected shaded region and the perceived shaded region 115.

The structure 105 may be any type of construction or object. In certain embodiments, the structure 105 may be a building, which may be residential, commercial, industrial, agricultural, educational, or of any other nature. In other embodiments the structure 105 may be personal property such as a vehicle, boat, aircraft, furniture, etc.

The property inspection system 106 may include a number of modules, devices, systems, sub-systems, or routines. For example, the property inspection system 106 includes a 3D scanning system or 3D scanner for generating 3D data, and may include a number of other sensing devices. In some embodiments, the property inspection system 106 includes a data collection module or system (for scanning or collecting data about the structure 105) and/or a data analysis module or system (for analyzing the scanned or collected data).

The shading system 113 includes a vehicle or device for moving the shading system 113. This device may be autonomous or remotely controlled. In some instances, the vehicle or device may be referred to as a "drone." In an embodiment, the vehicle or device may function as a shading apparatus. For example, the vehicle or device may create the shaded region 115 by using the body of the of the vehicle or device to block sunlight. In an embodiment, the shading system 113 may include a dedicated shading apparatus. This shading apparatus may have a curved shape, configured so that the concave side faces the sun 111. Regardless of its precise form, the shading system 113 can be positioned between the sun 111 and the region 115 to shade the region 115.

In operation, the property inspection system 106 inspects the structure 105 by scanning the structure 105 to detect light on the structure 105. In an embodiment, the detected light is projected onto the structure 105 (e.g., by the system 106). Such an embodiment may be referred to as an active scanner system. For example, the property inspection system 106 may detect deformations in a white light or laser light pattern (e.g., a line) projected onto the structure 105 within the shaded region 115.

In an embodiment, the detected light is sunlight. Such an embodiment may be referred to as a passive scanner system. For example, the system 106 may detect one or more defining edges or borders between the shaded region 115 and light 117 hitting the structure 115. Detecting and analyzing a border between the shaded region 115 and the light 117 provides energy and cost savings relative to an active scanner system because there is no need to provide a projector. Regardless of the origin of the light, the property inspection system 106 may analyze the detected light to generate data representing one or more features associated with the structure 105.

In an embodiment, the property inspection system 106 may scan the structure 105 and generate a full-color 3D model of the structure 105. The property inspection system 106 analyzes the data to estimate the condition of the structure 105. Based on the estimated condition of the structure, the property inspection system 106 may also determine that the structure 105 is damaged and may then automatically calculate a financial cost associated with the damage. For example, the property inspection system 106 may determine that the roof of the structure 105 is damaged and then calculate how much it will cost to fix the roof. With regard to a vehicle, boat, or aircraft, the property inspection system 106 may determine that a body panel, window, frame, or another surface associated with the vehicle, boat, or aircraft is damaged. The property inspection system 106 may calculate a cost to fix the body panel, window, frame, or other surface.

In an embodiment, the system 100 includes a coordinator 110. The coordinator 110 may be communicatively connected to the shading system 113 and/or the property inspection system 106. The coordinator 110 is a computer system, such as a server, and may include a number of modules, devices, systems, sub-systems, or routines. The coordinator 110 includes a communication interface for establishing wired or wireless communication with the shading system 113 and/or property inspection system 106. In an example embodiment, the coordinator 110 is a server configured to execute one or more applications enabling it to communicate with the shading system 103 and/or property inspection system 106 to control the shading system 103 and/or property inspection system 106. For example, the coordinator 110 may transmit a signal to the shading system 113 to cause the shading system 113 to move to a position where the shading system 113 casts a shadow creating the shaded region 115. The coordinator 110 may then transmit a signal to the property inspection system 106 to cause the property inspection system 106 to scan the structure 105.

In an embodiment, the system 100 does not include the coordinator 110. For example, the shading system 113 may position itself to create the shaded region 115, and the property inspection system 106 may independently detect the shaded region 115 and scan the region 115 based on said detection.

Figure 1B:
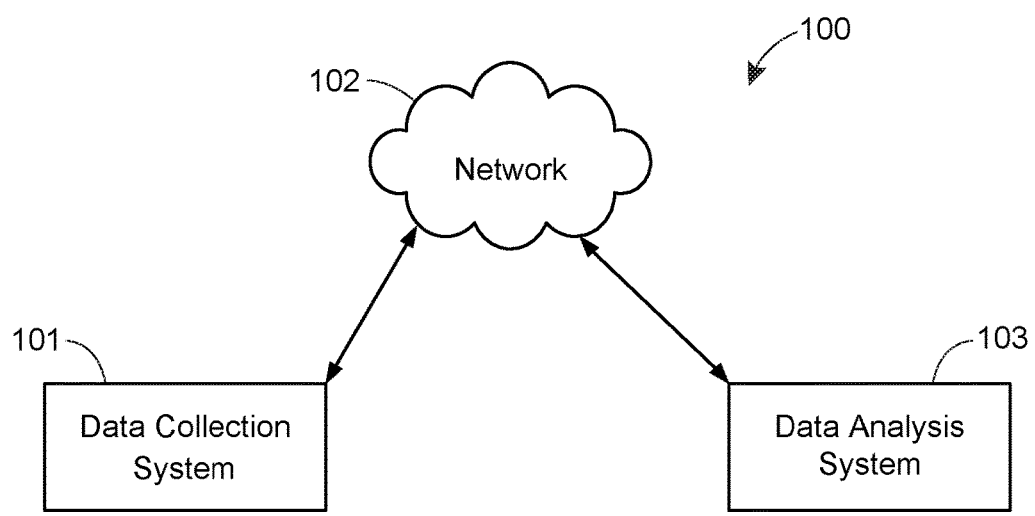
FIG. 1B illustrates a block diagram of a property inspection system according to a further embodiment.

FIG. 1B illustrates a block diagram of a property inspection system 100 according to an embodiment. The property inspection system 100 includes a data collection system 101, a network 102, and a data analysis system 103. In the property inspection system 100, the data collection system 101 and the data analysis system 103 are each communicatively connected to the network 102. In alternative embodiments of the property inspection system 100, the data collection system 101 may be in direct wired or wireless communication with the data analysis system 103. Furthermore, in some embodiments the data collection system 101 and the data analysis system 103 may exist on a single device or platform and may share components, hardware, equipment, or any other resources. The network 102 may be a single network, or may include multiple networks of one or more types (e.g., a public switched telephone network (PSTN), a cellular telephone network, a wireless local area network (WLAN), the Internet, etc.).

In example operation, the data collection system 101 scans a structure (such as structure 105) and generates data representing the scanned information. In certain embodiments, the data collection system is operable on a 3D scanning system such as the data collection system 201 shown in FIG. 2. The generated data may represent a point cloud or 3D model of the scanned structure. The data collection system 101 transmits the generated data over the network 102. The data analysis system 103 receives the generated data from the network 102, where the data analysis system 103 estimates the condition of the structure by analyzing the generated data. In some embodiments, estimating the condition of the structure may include comparing the generated data to reference data. The reference data may be any type of data that can provide a point of comparison for estimating the condition of the structure. For example, the reference data may represent an image, model, or any previously collected or generated data relating to the same or a similar structure. The reference data may also represent stock images or models unrelated to the scanned structure. Furthermore, the data analysis system 103 may use the estimate of the condition of the structure to determine that the structure is damaged, and then may calculate an estimated cost correlated to the extent of the damage to the structure.

In some embodiments, the data collection system 101 wirelessly transmits, and the data analysis system 103 wirelessly receives, the generated data. While in the preferred embodiment the generated data represents a point cloud or 3D model of the scanned structure, the generated data may also correspond to any visual (2D or 3D), acoustic, thermal, or tactile characteristics of the scanned structure. The data collection system 101 may use one or more 3D scanners, image sensors, video recorders, light projectors, audio sensors, audio projectors, chemical sprays, chemical sensors, thermal sensors, and/or tactile sensors to scan the structure and generate the data. In some embodiments the network 102 may include one or more devices such as computers, servers, routers, modems, switches, hubs, or any other networking equipment.

In further embodiments of the property inspection system 100, the data collection system 101 may be handled or operated by a person. The data collection system 101 may also be affixed to a locally or remotely controlled device. The data collection system 101 may be affixed to a flying device, such as an unmanned aerial vehicle ("UAV"), airplane or helicopter. In some embodiments, the helicopter may be a multicopter with two or more rotors (e.g., a "quadcopter"). In some embodiments, the data collection system 101 may also be affixed to a projectile, balloon, or satellite.

II. Example Data Collection Systems

Figure 2:
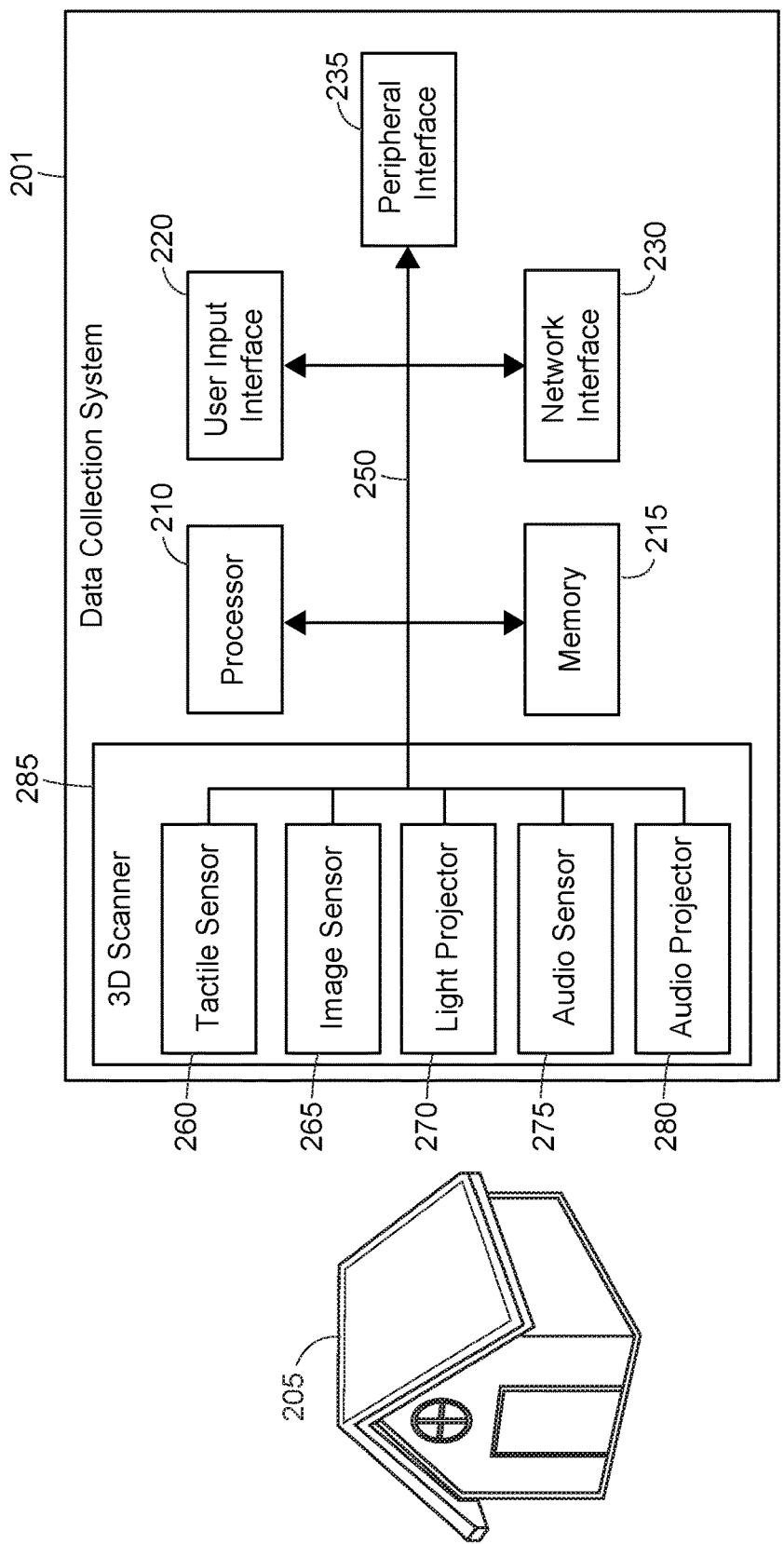
FIG. 2 illustrates a block diagram of a data collection system according to an embodiment.
Figure 3:
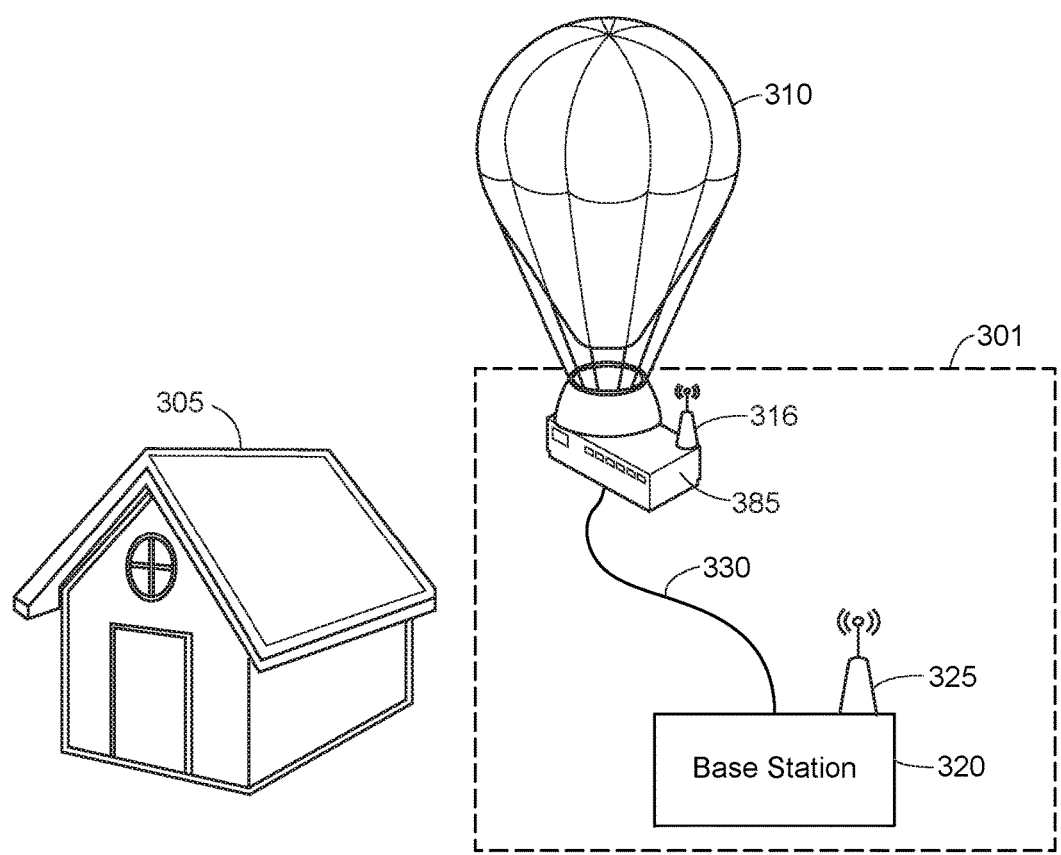
FIG. 3 illustrates a block diagram of a data collection system according to an embodiment.

FIGS. 2 and 3 illustrate block diagrams of a data collection system 201 according to an embodiment and a data collection system 301 according to an embodiment, respectively.

A. The Data Collection System 201

The data collection system 201 is used to scan a structure 205. For example, the data collection system 201 may be utilized in conjunction with the shading system 113 shown in FIG. 1 to scan a shaded region of a structure. This scan may be utilized to create a 3D model, which may be analyzed (e.g., by the data analysis system 103 shown in FIG. 1 or by the data collection system 201 itself, in some embodiments) to identify structural features and damage associated with the structure. The structure 205 may be any of the aforementioned structure types, such as a building, boat, vehicle, or aircraft.

The data collection system 201 includes a processor 210, a memory 215, a user input interface 220, a network interface 230, a peripheral interface 235, a system bus 250, and a 3D scanner 285. The 3D scanner 285 includes a tactile sensor 260, an image sensor 265, a light projector 270, an audio sensor 275, and an audio projector 280. In alternative embodiments, the 3D scanner 285 of the data collection system 201 may include only one of, or some subset of: the tactile sensor 260, the image sensor 265, the light projector 270, the audio sensor 275, and the audio projector 280. Some embodiments may also have multiple tactile sensors, multiple image sensors, multiple light projectors, multiple audio sensors, or multiple audio projectors.

In certain embodiments, the memory 215 may include volatile and/or non-volatile memory and may be removable or non-removable memory. For example, the memory 215 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The network interface 230 may include an antenna, a port for wired connection, or both.

In some embodiments, the peripheral interface 235 may be a serial interface such as a Universal Serial Bus (USB) interface. In other embodiments, the peripheral interface 235 may be a wireless interface for establishing wireless connection with another device. For example, in some embodiments the peripheral interface 235 may be a short range wireless interface compliant with standards such as Bluetooth (operating in the 2400-2480 MHz frequency band) or Near Field Communication (operating in the 13.56 MHz frequency band).

B. The 3D Scanner 285

In an embodiment, the 3D scanner 285 is a non-contact 3D scanner, which may be active (where the 3D scanner 285 emits radiation and detects the reflection of the radiation off of an object) or passive (where the 3D scanner 285 detects radiation that it did not emit). The 3D scanner may be a time-of-flight 3D scanner, a triangulation 3D scanner, a conoscopic 3D scanner, volumetric 3D scanner, a structured light 3D scanner, or a modulated light 3D scanner. The 3D scanner may use light detection and ranging (LIDAR), light field, stereoscopic, multi-camera, laser scanning, ultrasonic, x-ray, distance range system (laser or acoustic) technology, or some combination thereof. In example embodiments, the 3D scanner 285 includes a controller, microcontroller or processor for controlling the 3D scanner 285 and included components. Furthermore, in certain embodiments the 3D scanner includes internal memory.

In some embodiments of the 3D scanner 285 of the data collection system 201, the image sensor 265 may include any of a number of photosensor, photodiode, photomultiplier, or image sensor types, including charge-coupled-devices (CCD), complementary metal-oxide-semiconductors (CMOS), or some combination thereof. In some instances the image sensor 265 may be a single-camera setup. In other instances, the image sensor 365 may be a multi-camera setup. The light projector 270 may include one or more light sources and may project light in the frequency of either visible or invisible light (including infrared light and ultraviolet light). The light projector 270 may also project directional light such as a laser light. The light projector 270 may include, but is not limited to, LED, incandescent, fluorescent, high intensity discharge lamp, or laser light sources. The light projector 270 may emit a laser of any suitable wavelength. For example, the light projector 270 may emit a red laser, green laser, blue laser, purple laser, etc. In some embodiments, the light projector 270 may modulate the emitted laser. The light projector 270 may vary the modulation over time, enabling the 3D scanner 285 to detect a projected laser and correspond the detected laser to a time at which it was projected.

The audio sensor 275 may include any of a number of audio sensor or microphone types. For example, the audio sensor may include one or more condenser microphones, dynamic microphones, piezoelectric microphones, fiber optic microphones, laser microphones, or MEMS microphones.

The data collection system 201 may be held and operated by a person. The data collection system 201 may also be affixed to a remotely controlled device, such as a radio controlled device; a flying device; a device that rolls, drives, crawls, climbs or drives; a mechanical apparatus affixed to or near the structure 205; or a satellite. The processor 210, the memory 215, the user input interface 220, the network interface 230, the peripheral interface 235, and the 3D scanner 285 are each communicatively connected to the system bus 250. In an embodiment, the tactile sensor 260, the image sensor 265, the light projector 270, the audio sensor 275, and the audio projector 280 are also communicatively connected to the system bus 250. In certain embodiments, the tactile sensor 260, the image sensor 265, the light projector 270, the audio sensor 275, and the audio projector 280 communicate over a bus internal to the 3D scanner and are controlled by the 3D scanner.

In some embodiments, all or some of the elements in the data collection system 201 may be in contact with or close proximity to the structure 205. In other embodiments, all or some of the aforementioned elements may be remotely located in relation to the structure 205 (for example, and as discussed later, the data collection system 201 may be affixed, in whole or in part, to a satellite in orbit). The processor 210 is configured to fetch and execute instructions stored in the memory 215. The memory 215 is configured to store data such as operating system data or program data. The user input interface 220 is configured to receive user input and to transmit data representing the user input over the system bus 250. The peripheral interface 235 is configured to communicatively connect to a peripheral device such as a computer. The network interface 230 is configured to communicatively connect to a network, such as the network 102 shown in FIG. 1B, and wirelessly receive or transmit data using the network. In alternative embodiments, the network interface 230 may receive and transmit data using a wired connection, such as Ethernet.

The 3D scanner 285 is configured to receive control commands over the system bus 250 and scan an object such as the structure 205 to detect 3D characteristics of the scanned object. The 3D scanner 285 is further configured to transmit data representing a 3D data point, a point cloud or a 3D model ("3D data") relating to the scanned object over the system bus 250. The 3D scanner is further configured to use any of the tactile sensor 260, the image sensor 265, the light projector 270, the audio projector 270, or the audio projector 280 to generate and transmit the 3D data. The tactile sensor 260 is configured to capture sensory information associated with a surface of the structure 205 ("tactile data"), such as shapes and features or topography of the surface, and transmit the tactile data over the system bus 250.

The image sensor 265 is configured to capture an image of the structure 205 and transmit data representing the image ("image data") over the system bus 250. In certain embodiments, the image sensor may receive visible light, invisible light (such as infrared or ultraviolet), or radiation in other parts of the electromagnetic spectrum (radio waves, microwaves, x-rays, gamma rays, etc.). In some embodiments, for example, subsurface features may be detected using radar. The transmitted image data may represent a thermal, color, infrared, or panchromatic image.

The light projector 270 is configured to receive control commands over the system bus 250 from the 3D scanner 285 or the processor 210, and is further configured to project light in the direction of the structure 205. The audio sensor 275 is configured to receive an audio signal or sound waves reflected off of the structure 205 and transmit data representing the audio signal ("audio data") over the system bus 250. The audio projector 280 is configured to receive control commands over the system bus 250 or from the 3D scanner 285 and project a sound or audio signal in the direction of the structure 205.

In example operation, the network interface 250 receives data representing a command to collect 3D information associated with the structure 205 ("3D capture command"). The network interface 250 transmits the 3D capture command over the system bus 250 to the processor 210, where the 3D capture command data is received. The processor 210 then transmits, over the system bus 250, a signal ("3D capture signal") instructing the 3D scanner 285 to detect 3D characteristics associated with an object. The 3D scanner 285 scans the structure 205 and generates data representing 3D characteristics of the structure 205 ("3D data") corresponding to the collected 3D information. More particularly, in one embodiment the 3D scanner 285 projects a light pattern onto the structure 205. The 3D scanner 285 then records the structure 205 and the projected light pattern. The 3D scanner 285 may then alter the projected light pattern or the area of the structure 205 on which the light pattern is projected. The 3D scanner 285 then records, for a second time, the structure 205 and projected light pattern. This process may be continuously repeated until a sufficient portion of the structure 205 has been scanned.

In further example operation, the 3D scanner 285 analyzes the deformations associated with each of the recorded light patterns to identify coordinate sets associated with the structure 205. Each coordinate set includes vertical, horizontal, and depth distance measurements (relative to the 3D scanner 285) of a particular point on the surface of the structure 205. The 3D scanner 285 generates 3D data points representing each of the coordinate sets associated with the scanned points on the surface of the structure 205. In some embodiments (particularly in embodiments where the 3D scanner moves or uses sensors in multiple locations or positions), the 3D scanner 285 may normalize the coordinates for all of the collected 3D data points so that the 3D data points share a common coordinate system. In alternative embodiments, the coordinates may be normalized by a processor external to the 3D scanner 285. In any event, the 3D scanner 285 then stores a point cloud, constructed from the 3D data points, to memory 215. The processor 210 operates to transmit the 3D data (i.e., the point cloud) to the network interface 230, where the 3D data is transmitted over a network such as the network 102 shown in FIG. 1b. In certain embodiments, the 3D data may represent a 3D model that was constructed by the processor 210 or the 3D scanner 285.

In some embodiments, the 3D scanner may be a time-of-flight 3D scanner where the round trip time of a laser is identified in order to identify the distance to a particular point on the structure 205. The 3D scanner 285 may also be any type of triangulation 3D scanner that uses ordinary light or laser light. Furthermore, in some embodiments the 3D scanner 285 may use any one of or a combination of the tactile sensor 260, the image sensor 265, the light projector 270, the audio sensor 275, or the audio projector 280 in generating the 3D data.

In example operation, the image sensor 265 receives a signal ("image capture signal") from the 3D scanner 285 instructing the image sensor 265 to capture reflected light or to capture an image. The image sensor 265 receives the image capture signal and the image sensor 265 is exposed to light reflected off of the structure 205. The image sensor 265 generates image data representing at least part of an image of the structure 205, wherein the image corresponds to the light that the image sensor 265 was exposed to. The 3D scanner 285 then uses the image data to generate 3D data. Alternatively, the image data may be transmitted over the system bus 250 to the memory 215 where the image data is stored. Furthermore, the 3D scanner 285 may also use image data corresponding to multiple previously captured images to generate the 3D data.

In some embodiments, the image sensor 265 may be utilized to capture 2D images. In some embodiments the 3D scanner 285 may use the image sensor 265 to capture 2D images in order to supplement the 3D data captured by the 3D scanner 285. In other embodiments, the data collection system 201 may use the image sensor 265 to capture 2D images independently of the 3D scanner 285. The 2D image data may be transmitted to the memory 215 to be stored. The 2D image data may also be transmitted, via the network interface 230, to a data analysis system such as the data analysis system 103, where the 2D image data, or combination 2D-3D image data, may analyzed to estimate the condition of the structure 205. In an embodiment, the image sensor captures at least two 2-dimensional (2D) images, each of the at least two 2D images captured from a different angle. The 3D scanner 285 may then generate a 3D model based on the at least two capture images by utilizing photogrammetry techniques to stich the images together to form a 3D model.

In some embodiments, the image sensor 265 may be used to detect thermal characteristics associated with the structure 205 in addition to visual characteristics associated with the structure 205 (capturing infrared light, for example). Furthermore, in some embodiments the light reflected off of the structure 205 may originate from the light projector 270, while in other embodiments the light may originate elsewhere. In the former case, the processor 210 or the 3D scanner 285 operates to transmit a command instructing the light projector 270 to generate light. The light projector 270 receives the command to generate light and projects light in the direction of the structure 205. The light may be visible light, such as laser light or ordinary light emitted from an HID lamp; or invisible light, such as infrared light or ultraviolet light. In certain embodiments, the light projector 370 may also be configured to emit radiation in other frequencies of the electromagnetic spectrum (e.g., radio waves, microwaves, terahertz radiation, x-rays, or gamma rays). For example, the light projector 370 may emit radio waves. The radio waves may reflect off the structure 205 and may be detected by an antenna (not shown) communicatively coupled to the data collection system 201. In such an embodiment, the light projector and antenna may operate as a radar system, allowing the data collection system 201 to, for example, scan a subsurface associated with the structure 205. In one embodiment, for example, the data collection system 201 may scan the subsurface associated with shingles, enabling a data analysis system to determine if the subsurface of the shingles are damaged.

In operation of the audio sensor 275, the audio sensor 275 receives a signal from the 3D scanner 285 instructing the audio sensor 275 to detect audio or sound waves ("audio capture signal"). The audio sensor 275 receives the audio capture signal and the audio sensor 275 is exposed to one or more audio signals or sound waves reflected off of the structure 205. The audio sensor 275 generates audio data representing at least part of one of the audio signals that the audio sensor 275 was exposed to. The 3D scanner 285 then uses the audio data to generate 3D data. Alternatively, the audio data may then be transmitted over the system bus 250 from the audio sensor 275 to the memory 215 where the audio data is stored.

In some embodiments, the audio signals or sound waves received at the audio sensor 275 may originate from the audio projector 280, while in other embodiments the audio signals may originate elsewhere. In the former case, the processor 210 operates to transmit a command instructing the audio projector 280 to generate audio. The audio projector 280 receives the command to generate audio and emits one or more sound waves or audio signals in the direction of the structure 205. In certain embodiments the audio sensor 275 and the audio projector 280 may operate as a sonar system, allowing the data collection system 201 to, for example, scan a subsurface associated with the structure 205. In one embodiment, for example, the data collection system 201 may scan the subsurface associated with shingles, enabling a data analysis system to determine if the subsurface of the shingles are damaged.

In some embodiments, the image capture signal, the audio capture signal, or the tactile capture signal may be received from the processor 210, wherein the respective signal was generated in response to a capture command received by the processor 210 from the peripheral interface 235, the network interface 230, or the input interface 220. Likewise, the processor 210 may operate to transmit the image data, audio data, tactile data, or 3D data to the network interface 230 or the peripheral interface 235 to be transmitted to another device or system.

In further embodiments, the data collection system 201 may include a chemical spray device, or may be used in conjunction with a chemical spray device, wherein the chemical spray device sprays a chemical onto a surface of the structure 205. The chemical may then be detected in order to help generate the image data or tactile data. In such an embodiment, the data collection system 201 may include or may be used in conjunction with a chemical detection sensor. In some embodiments, the presence of the chemical may also be detected using the image sensor 265. For example, a visually distinct or luminescent chemical (such as a phosphorescent or fluorescent chemical) may be sprayed on the structure 205. The image sensor 265 may then be used to detect the presence and extent of luminescence on the structure 205. A black light may also be used in conjunction with the process of detecting the chemical. The degree of luminescence present on the structure 205 may be used to determine topographical features associated with the structure 205 and may be used by the 3D scanner in generating 3D data. For example, the degree of luminescence may indicate pooling or seeping at certain locations on the surface of the structure. Detecting the luminescent chemical may also reveal run-off or drainage patterns, which may indicate an uneven surface or a dent on the surface.

In further embodiments, the data collection system 201 may be configured to implement a data analysis method wherein the processor 210 accesses one or more of the image data, the audio data, the tactile data, or the 3D data on the memory 215 for analysis. The processor 210 may further operate to estimate the condition of the structure 205 based on said analysis.

C. The Data Collection System 301

FIG. 3 illustrates a block diagram of a data collection system 301 according to an embodiment. The data collection system 301 is configured to scan the structure 305. The data collection system 301 may be utilized in conjunction with the shading system 113 shown in FIG. 1 to scan a shaded region of a structure. This scan may be utilized to create a 3D model, which may be analyzed (e.g., by the data analysis system 103 shown in FIG. 1 or by the data collection system 301 itself, in some embodiments) to identify structural features and damage associated with the structure.

The data collection system 301 includes a 3D scanner 385, a flying device 310, a base station 320, an antenna 325, and a tether 330. The 3D scanner 385 includes an antenna 316. The flying device 310 may be a balloon, airplane, helicopter, projectile, rocket, or any other device capable of flight, levitation, or gliding.

In an embodiment, the 3D scanner 385 is similar to the 3D scanner 285 and may also include one or more of: a tactile sensor similar to the tactile sensor 260, an image sensor similar to the image sensor 265, a light projector similar to the light projector 270, an audio sensor similar to the audio sensor 275, or an audio projector similar to the audio projector 280. The base station 320 may include one or more of: a processor similar to the process 210, a memory similar to the memory 215, a peripheral interface similar to the peripheral interface 230, a user input interface similar to the user input interface 220, or a transmitter similar to the transmitter 235.

In the data collection system 301, the 3D scanner 385 is affixed to the flying device 310. In the data collection system 301, the 3D scanner 385 is tethered to the base station 320. The antenna 316 of the 3D scanner 385 is in communication with the antenna 325 of the base station 320.

In operation of the data collection system 301, the flying device 310 is used to position the 3D scanner 385 at an elevation higher than at least part of the structure 305. The tether 330 functions to keep the flying device 310 within the vicinity of the base station 320 by tethering the flying device 310 to the base station 320. In some embodiments, the tether 330 may provide power to the flying device 310. The tether may also provide a communication channel between the flying device 310 and the base station 320 (and may replace the antennas 316 and 325 in certain embodiments). When the 3D scanner 385 has reached the desired elevation, the 3D scanner 385 collects information associated with the structure 305. In the preferred embodiment, the 3D scanner 385 scans the structure 305 and generates 3D data (e.g., 3D data points, a point cloud, or a 3D model). In some embodiments the 3D scanner 385 may collect image information, audio information, or tactile information as discussed with regard to the data collection system 201. The 3D scanner 385 then uses the antenna 316 to transmit the collected information to the antenna 325 of the base station 320. The base station 320 then transmits the collected information over a network such as network 102 shown in FIG. 1b.

In some embodiments, the base station 320 may be affixed to the flying device 310 along with the 3D scanner 285 and the tether 330 may instead tether the data collection system 301 to an anchoring device or apparatus. In such embodiments, the components of the data collection system 301 may communicate over a system bus such as the system bus 250 discussed with regard to FIG. 2.

In further embodiments, the flying device 310 may operate to bring the 3D scanner 385 in contact with the structure 305, or may drop the 3D scanner 385 onto the structure 305. In some embodiments, the flying device 310 may operate autonomously. The flying device 310 may also be controlled wirelessly by a remote device such as a radio control device. Furthermore, in certain embodiments the 3D scanner 385 may be free of a connection to the tether 330. In some embodiments the 3D scanner 385 may be held and operated by a person, while in others the 3D scanner 385 may be affixed to a mechanical apparatus located on or near the structure 305.

III. Example Shading System

Figure 4:
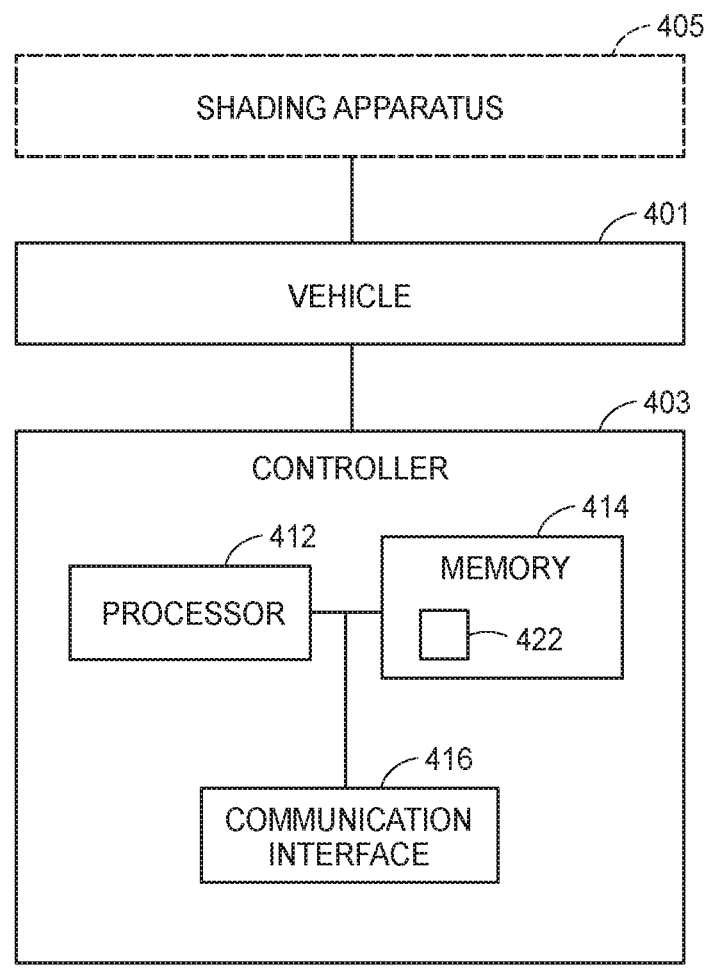
FIG. 4 illustrates an example shading system according to an embodiment.

FIG. 4 illustrates a block diagram of the shading system 113 (an embodiment of which is also shown in FIG. 1) according to an embodiment. The shading system 113 includes a device or vehicle 401 and a controller 403. In an embodiment, the shading system 113 includes a shading apparatus 405.

A. The Vehicle 401

The vehicle 401 may be any type of suitable vehicle. For example, the vehicle 401 may be a hovering or flying device. In some instances, the vehicle 401 may be referred to as a drone, unmanned aerial vehicle ("UAV"), airplane, balloon, or helicopter. In some embodiments, the helicopter may be a multicopter with two or more rotors (e.g., a "quadcopter"). The vehicle 401 includes a propulsion system that moves the vehicle 401 when actuated. The propulsion system may include a power source (e.g., a motor or engine) and/or a thrust means (sometimes referred to as a thruster). The thruster may be driven by the power source. Example thrusters include: propellers, rotors, wheels and axles, turbofans, and jets. The propulsion system may be controlled by the controller 403

B. The Controller 403

The controller 403 may be installed on or within the vehicle 401. The controller 403 includes a processor 412, a memory 414, and a communication interface 416. The memory 414 may include a control routine 422. The control routine may be executed by the processor 412 to transmit and receive signals (via the communication interface 416) for controlling the vehicle 401. For example, the processor 412 may execute the control routine 422, causing the controller 403 to actuate the propulsion system of the vehicle 401 in order to move the vehicle 401. For example, in certain embodiments the vehicle 401 may be a helicopter or quadcopter, and the controller 403 may control lift and thrust of the vehicle 401 by controlling rotors of the vehicle 401.

In an embodiment, the controller 403 determines the sun's position. The controller 403 may determine the sun's position by receiving signals (e.g., via the communication interface 416) from light sensors configured to detect light from the sun. For example, the light sensors may detect an angle at which the light is hitting the sensors. In an embodiment, the light sensors may be arranged at multiple orientations and positions to, e.g., triangulate the sun's position. The controller 403 may rely on signals from the light sensors to determine the sun's position. In an embodiment, the controller 403 may also rely on a determined orientation and/or position of the vehicle 401 to determine the sun's position relative to the vehicle 401.

In an embodiment, the controller 403 includes one or more movement/position sensors. These movement/position sensors may include accelerometers, gyroscopes, and/or various other movement and position sensors to determine the movement, position, and/or orientation of the vehicle 401. In some embodiments, the controller 403 may include a global positioning system (GPS) that communicates with satellites to determine the position of the vehicle 401. In some embodiments, one or more of the movement and/or position sensors may be installed on the vehicle 401, and may communicate with the controller 403 via the communication interface 416.

In an embodiment, controller 403 determines the sun's position based on data stored to the memory 414 (this may be referred to as "sun data"). For example, the memory 414 may include data representing the sun's position for particular dates and times. That is, the data may include a number of positions in the sky for the sun, wherein each of the positions in the sky corresponds to a particular time of the day and/or to a particular day. The controller 403 may determine the sun's position by referencing an internal clock, for example, to obtain a current time and by identifying a position in the sky listed in the data for that particular time. The clock may be a hardware or software clock, depending on the embodiment. In some instances, the data may not list a position for the current time the controller 403 is utilizing. In such an instance, the controller 403 may identify a position for the time closest to the current time, or may interpolate between two times listed within the data and between two corresponding positions for those times to identify a current position for the sun.

The sun data may be downloaded to the memory 422 before the shading system 113 is deployed to scan a structure. In some embodiments, this data is downloaded to the memory 422 while the shading system 113 is scanning a structure. The data may be downloaded by way of the communication interface 416, which may be wirelessly coupled to a base station or server configured to provide the data.

In an embodiment, the controller 403 determines a current orientation and a current position of the vehicle 401 and/or the shading apparatus 405 based on data received from one or more movement/position sensors. The controller 403 may determine a distance and direction that the vehicle 401 and/or the shading apparatus 405 needs to be moved based on: (a) the determined current orientation and current position of the vehicle 401 and/or shading apparatus 405, (b) the position of the sun, and (c) the position of the area where the shaded region is to be created. For example, the controller 403 may identify a line from the sun's position to the area where the shaded region is to be created. The controller 403 may then actuate the propulsion system of the vehicle 401 based on the determined distance and direction that the vehicle 401 and/or shading apparatus 405 needs to be moved.

In an embodiment, the controller 403 wirelessly receives control commands via the communication interface 416. These control commands may be transmitted from a radio control device. The radio control device may be controlled by a human operator or by a remote computer, depending on the embodiment. In some embodiments, the communication interface 416 is not configured for wireless communication.

C. The Shading Apparatus 405

In an embodiment, the shading system 113 includes the shading apparatus 405. The shading apparatus 405 may be affixed to the vehicle 401.

The shading apparatus 405 may have a curved shape, configured so that the concave side faces the sun 111. In some embodiments, the shading apparatus 405 may have a different shape. For example, the shading apparatus 405 may be substantially flat in some embodiments. In some embodiments, the shading apparatus 405 may be configured so that a convex side faces the sun. The shading apparatus 405 may be constructed of one or more of the following materials: canvas, metal (e.g., aluminum), plastic, rubber, wood, ceramics, woven fibers; cotton; hair; vegetable; or some combination thereof.

In an embodiment, shading system 113 does not include the shading apparatus 405. In such an embodiment, the shading system 113 may use the body of the vehicle 401 to block the sun.

D. Other Aspects of the Shading System 113

In an embodiment, the shading system 113 includes a data collection system and/or 3D scanner. For example, in some embodiments, the shading system 113 may include: the 3D scanner 106 shown in FIG. 1, the data collection system 201 shown in FIG. 2, the 3D scanner 285 shown in FIG. 2, the data collection system 302 shown in FIG. 3, the 3D scanner 385 shown in FIG. 3, or some combination thereof.

IV. Example Data Analysis System

Figure 5:
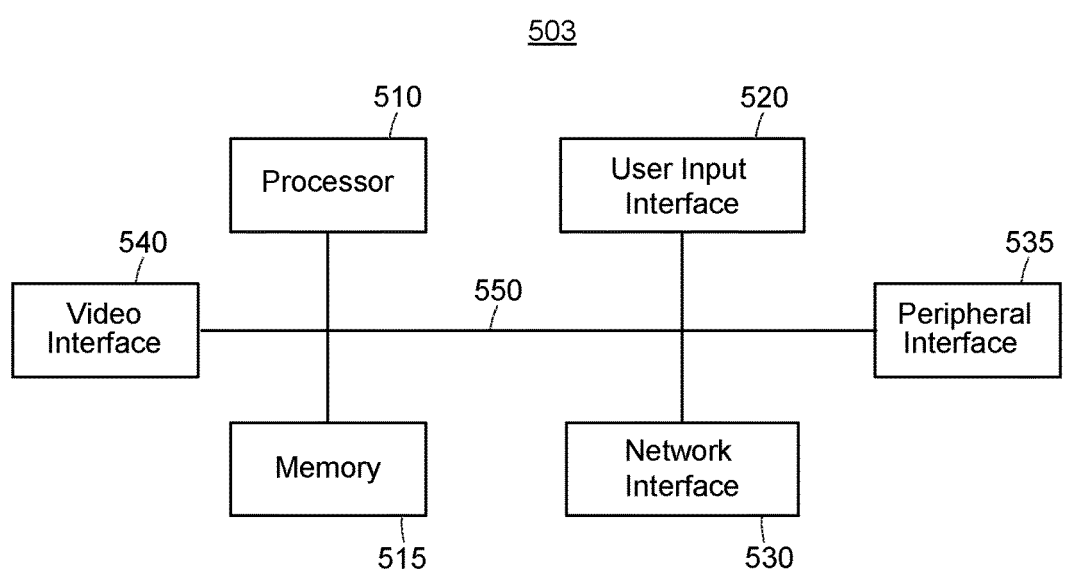
FIG. 5 illustrates a block diagram of a data analysis system according to an embodiment.

FIG. 5 illustrates a block diagram of a data analysis system 503 according to an embodiment. The data analysis system 503 includes a processor 510, a memory 515, a user input interface 520, a network interface 530, a peripheral interface 535, a video interface 540, and a system bus 550. The processor 510, memory 515, user input interface 520, network interface 530, peripheral interface 535, and video interface 540 are each communicatively connected to the system bus 550.

In example operation, the network interface 535 receives 3D data points corresponding to a structure such as the structure 205 shown in FIG. 2. The network interface 535 transmits the received data over the system bus 550 to the memory 515. The processor 510 accesses the memory 515 to generate a first 3D model of the structure based on the 3D data points, wherein the edges and vertices associated with the model are derived from the 3D data points. The processor 510 may then make one or more comparisons between the first 3D model and one or more second models. The second models may represent previously received data relating to the same structure, or they may represent previously received data relating to similar structures. Alternatively, the second models may have been created specifically for the purpose of estimating the condition of a structure and may not relate to any actual physical structure. Based on the one or more comparisons, the processor 510 generates an estimate of the condition of the structure. The estimate of the condition of the structure is saved to the memory 515. In some embodiments, network interface 530 may receive 2D image data or 2D-3D combination image data and may transmit the data to the memory 515. The processor 510 may identify features with the 2D images and/or 2D-3D combination images and may generate the estimate of the condition of the structure in accordance with the identified features.

In further example operation, the processor 510 may determine, based on the generated estimate, that the structure has been damaged. The processor 510 may then operate to calculate (based on the condition of the structure and data relating to costs such as cost of supplies, materials, components and labor) an estimated financial cost associated with the damage. The estimated financial cost is then saved to the memory 515. The video interface 540 may be used to display: the first 3D model, any of the one or more second models, the estimate of the condition of the structure, or the estimated financial cost.

In some embodiments, the received data may also represent images, videos, sounds, thermal maps, pressure maps, or topographical maps, any of which may be displayed via the video interface 540. The received data may then be used to generate a 3D model. Alternatively, the received data may be compared to reference images, videos, sound, thermal maps, pressure maps, or topographical maps to estimate the condition of the structure.

V. An Example Method for Inspecting and Analyzing the Condition of a Structure

Figure 6:
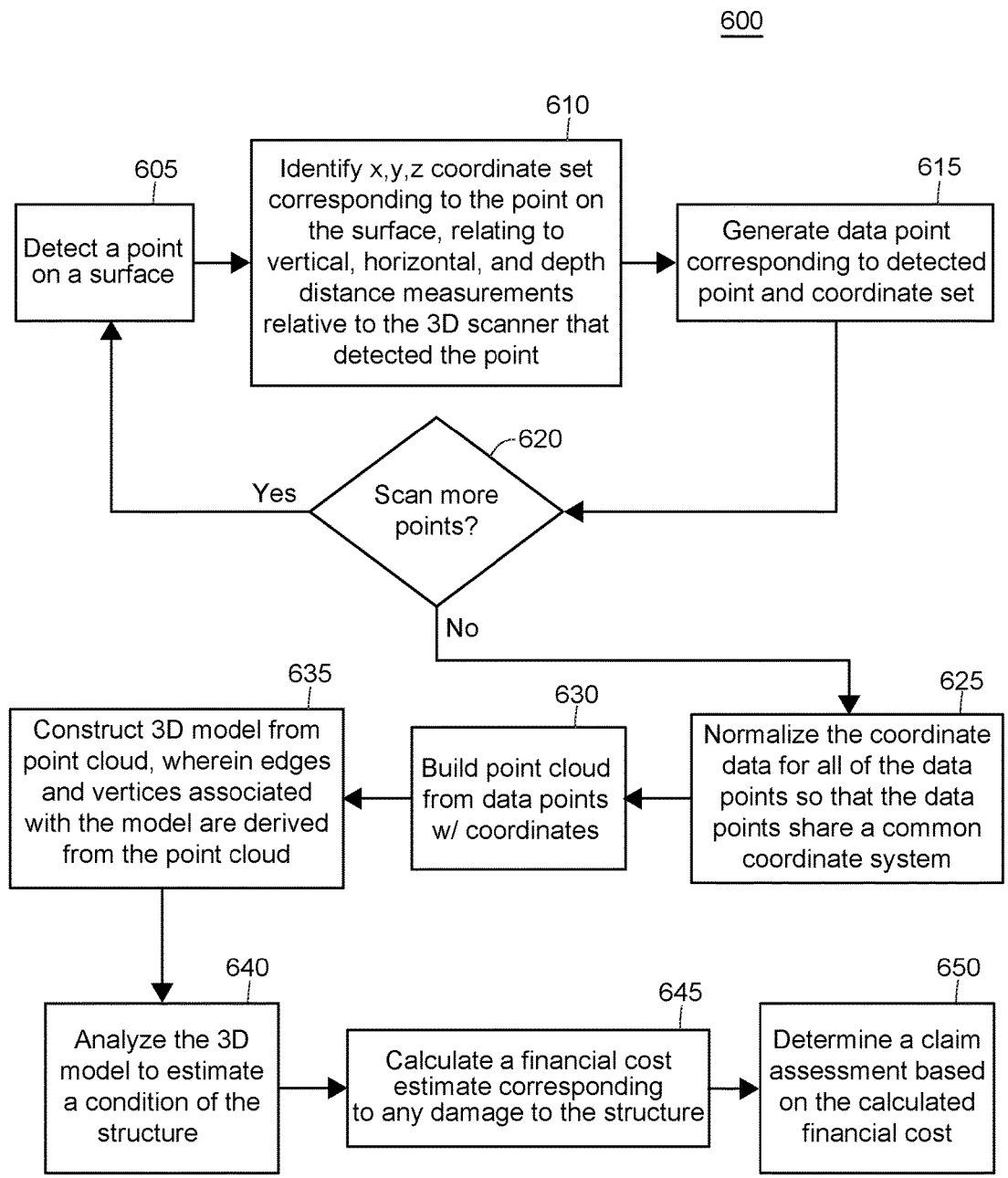
FIG. 6 illustrates a flow chart of an example method for inspecting and analyzing the condition of a structure according to an embodiment.

FIG. 6 illustrates a flow chart of an example method 600 for inspecting and analyzing the condition of a structure. The method 600 may be implemented, in whole or in part, on one or more devices or systems such as those shown in the property inspection system 100 of FIG. 1, the data collection system 201 of FIG. 2, the data collection system 301 of FIG. 3, or the data analysis system 503 of FIG. 5. The method 600 may be saved as a set of instructions, routines, programs, or modules on memory such as memory 215 of FIG. 2 or memory 515 of FIG. 5, and may be executed by a processor such as processor 210 of FIG. 2 or processor 510 of FIG. 5.

The method 600 begins when a 3D scanner scans a structure, such as the structure 205 shown in FIG. 2, or structure 305 shown in FIG. 3, and detects a point on the surface of the structure (block 605). The structure may be any kind of building or structure. The structure may be, for example, a single-family home, townhome, condominium, apartment, storefront, an industrial building, an agricultural structure, a manufacturing structure, or a retail space; and the structure may be owned, leased, possessed, or occupied by an insurance policy holder. The structure may also be any of the structure types discussed regarding FIG. 1, such as a vehicle, boat, or aircraft. In such structures, the 3D scanner may be used to inspect the body panels, windows, frame, and other surfaces associated with the vehicle, boat, or aircraft. Next, the 3D scanner identifies a coordinate set corresponding to each detected point on the surface of the structure (block 610). The coordinate set relates to vertical, horizontal, and depth distance measurements relative to the 3D scanner that detected the point.

The 3D scanner then generates a 3D data point, corresponding to the detected point on the surface of the structure, that includes the corresponding coordinate data (block 615). The 3D data point may then be saved to memory. A decision is made thereafter to either stop scanning the structure or continue scanning the structure (block 620). If there is more surface area or more surface points to be scanned, the 3D scanner continues scanning the structure. Otherwise, the method 600 continues to block 625.

When it is determined that no further scanning is required, the method 600 activates the 3D scanner, or a processor such as the processor 210 of FIG. 2 or the processor 510 of FIG. 5, to normalize the coordinate data for all of the generated 3D data points so that the 3D data points share a common coordinate system (block 625). The normalized 3D data points may then be saved to memory. The 3D scanner, or a processor, operates to build a point cloud from the 3D data points (block 630). This may be done by sampling or filtering the 3D data points. Alternatively, all of the 3D data points may be used. In any event, the point cloud may then be saved to memory.

After the point cloud is saved, the 3D scanner or processor operates to construct a 3D model from the point cloud (block 635). The edges and vertices associated with the model are derived from the points in the point cloud. Any of a number of surface reconstruction algorithms may be used to generate the surface of the model. In certain embodiments the surface reconstruction may be skipped altogether and the raw point cloud may be subsequently used instead of the constructed 3D model.

Next, a processor such as the processor 210 of FIG. 2 or the processor 510 of FIG. 5 operates to analyze the 3D model (or point cloud) to estimate a condition of the structure (block 640). In some embodiments, this may include comparing the model to other models, wherein the other models relate to previously collected data corresponding to the same structure, or previously collected data corresponding to other structures. In the alternative, the other models may only exist for the purpose of analysis or estimation and may not correlate to any real structure.

Based on the estimated condition of the structure, a processor operates to calculate a financial cost estimate corresponding to any damage to the structure (block 645). In some embodiments, the financial cost estimate may correspond to the estimated cost for materials, labor, and other resources required to repair or refurbish the structure.

After calculating a financial cost estimate, a processor operates to determine a claim assessment (block 650). The claim assessment may then be saved to memory. In some embodiments the claim assessment may be sent to a third party associated with the structure, such as a client holding an insurance policy on the structure. In other embodiments the claim assessment may be sent to an insurance agent for evaluation.

VI. An Example Method for Detecting a Point on a Surface

Figure 7:
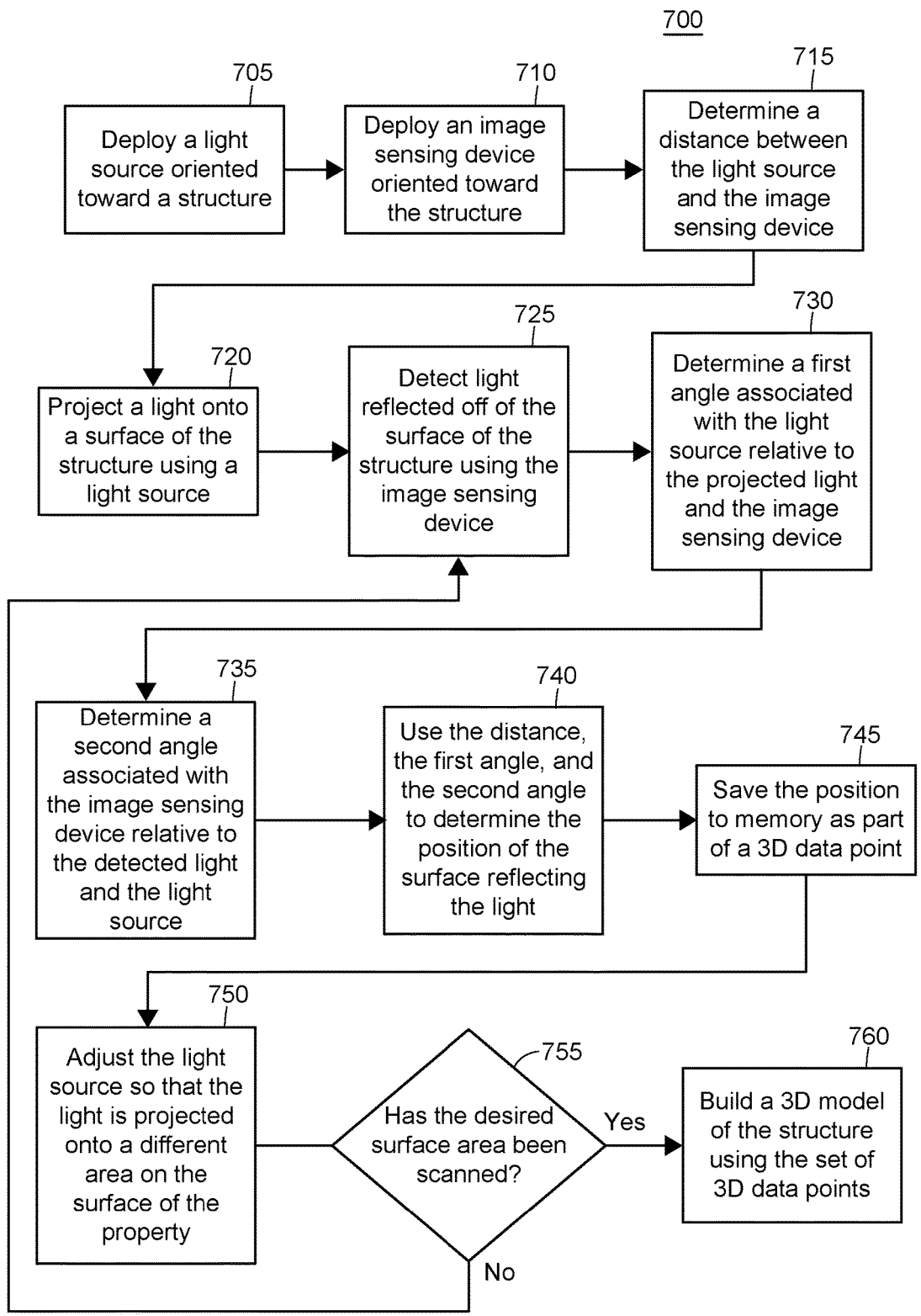
FIG. 7 illustrates a flow chart of an example method for detecting a point on a surface using a 3D scanner according to an embodiment.

FIG. 7 illustrates a flow chart of an example method 700 for detecting a point on a surface using a 3D scanner. The method may be implemented by a 3D scanner, such as the 3D scanner 285 of FIG. 2 or the 3D scanner 385 of FIG. 3.

The method 700 begins when a light source is deployed oriented toward a structure such as structure 105, 205, or 305 of FIG. 1, 2, or 3, respectively (block 705). The light source may be a part of the 3D scanner, or it may be a separate device used in conjunction with the 3D scanner. The light source may be any type of light source, but in the preferred embodiment the light source is a laser that projects a dot or line. In other embodiments the light source may be a white light source that projects a pattern onto an object.

A photosensor or image sensing device, such as the image sensor 265 of FIG. 2, is then deployed oriented toward the structure (block 710). The image sensing device may be part of the 3D scanner, or it may be a separate device used in conjunction with the 3D scanner. In the preferred embodiment, the image sensing device is capable of detecting and processing laser light. After the image sensing device has been deployed, the distance between the light source and the image sensing device is determined (block 715).

The light source projects light onto a surface of the structure (block 720) and the image sensing device detects light reflected off of the surface of the structure (block 725). In order to identify the position of the surface reflecting the light, a first and second angle are determined (block 730 and block 735, respectively). The first angle includes the light source as an end point, the projected light beam or laser as a first side, and a line extending to the image sensing device as the second side of the angle. The second angle includes the image sensing device as an end point, the received light beam or laser as a first side, and a line extending to the light source as a second side of the angle. Finally, the position (including depth) of the surface reflecting the light is determined (block 740) using the distance discussed in relation to block 715, the first angle discussed in relation to block 730, and the second angle discussed in relation to block 735.

The position of the surface reflecting the light is saved to memory as coordinate data included in a 3D data point (block 745). The coordinate data may be relative to the 3D scanner, or it may be normalized so that is it is consistent with other saved 3D data points. After saving the coordinate data, the light source is adjusted so that the light is projected onto a different area on the surface of the property (block 750). A decision is then made to either continue scanning or stop scanning (block 755). If more of the structure needs to be scanned, the method returns to block 725 where the light from the adjusted light source is reflected off of the surface of the structure and detected. If the structure has been sufficiently scanned, the 3D scanner or a processor can begin the process of building a 3D model of the structure using the 3D data points (block 760).

VII. An Example Laser-Line Scan

Figure 8A:
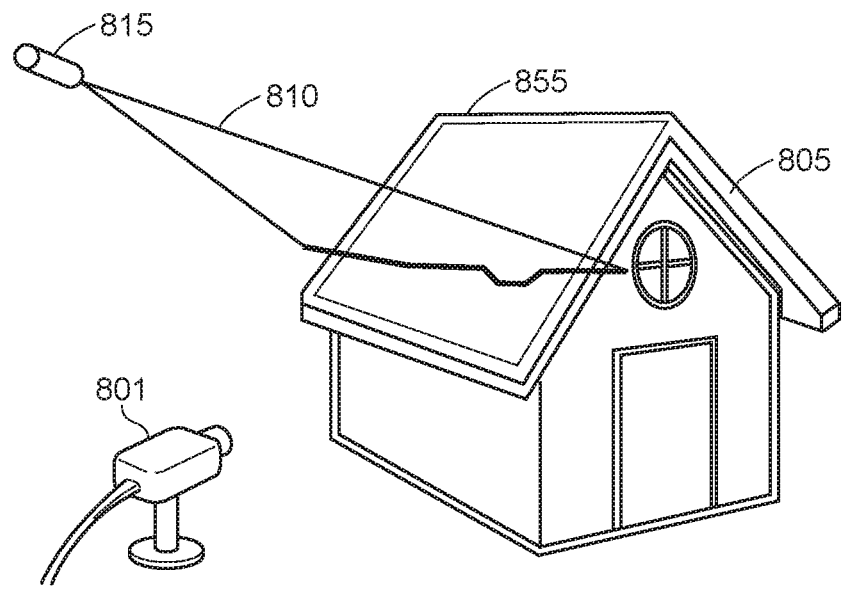
FIG. 8A illustrates an example 3D scanner detecting a projected laser line to scan a roof of a structure according to an embodiment.
Figure 8B:
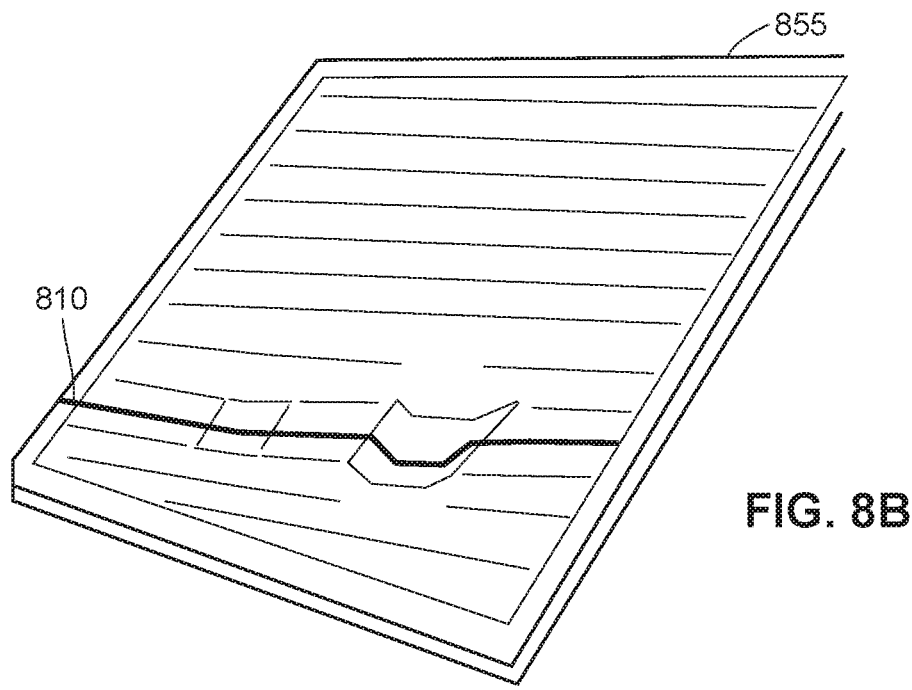
FIG. 8B illustrates the roof from FIG. 8A in more detail according to an embodiment.

FIG. 8A illustrates an example 3D scanner 801 detecting a projected laser line 810 to scan a roof 855 of a structure 805 according to an embodiment. Deformations in the line 810 reveal damage to the roof. FIG. 8B illustrates the roof 855 in more detail. The laser line 810 is projected by a light projector 815. In some embodiments, the light projector 815 is part of the 3D scanner 801.

The laser line 810 deforms according to indentations in the roof 855 and/or protrusions from the roof 855. The 3D scanner 801 can detect these deformations in the laser line 810 to identify indentations and/or protrusions, revealing potential damage.

In example operation, the scanner 801 detects the laser line 801. The laser line 810 may be moved to scan a different section of the roof. For example, the laser line 810 may start at the top of the roof 855 and the scanner 801 may detect the laser line 810 at this position. The laser line 810 may then move down the roof (e.g., by an inch), and the scanner 801 may detect the laser line 810 at the new position. This process may repeat until the entire roof 855 has been scanned. The scanner 801 may detect the laser line 810 by taking a picture or video, for example. The scanner 801 may struggle to detect the laser line 810 during the day. In short, light from the sun may effectively wash out the laser line 810, giving the laser line 810 little contrast relative to the environment.

To address this problem with detecting the laser line during the day, the shading system 113 shown in FIGS. 1 and 4 can be utilized to create one or more shaded regions on the roof 855. By blocking the sun, the laser line 810 can be projected within the shaded region where it can be detected by the scanner 801, enabling the scanner 801 to collect 3D information about the roof 855 and to generate a model of at least part of the structure 805.

VIII. Example Shading Systems

Figure 9:
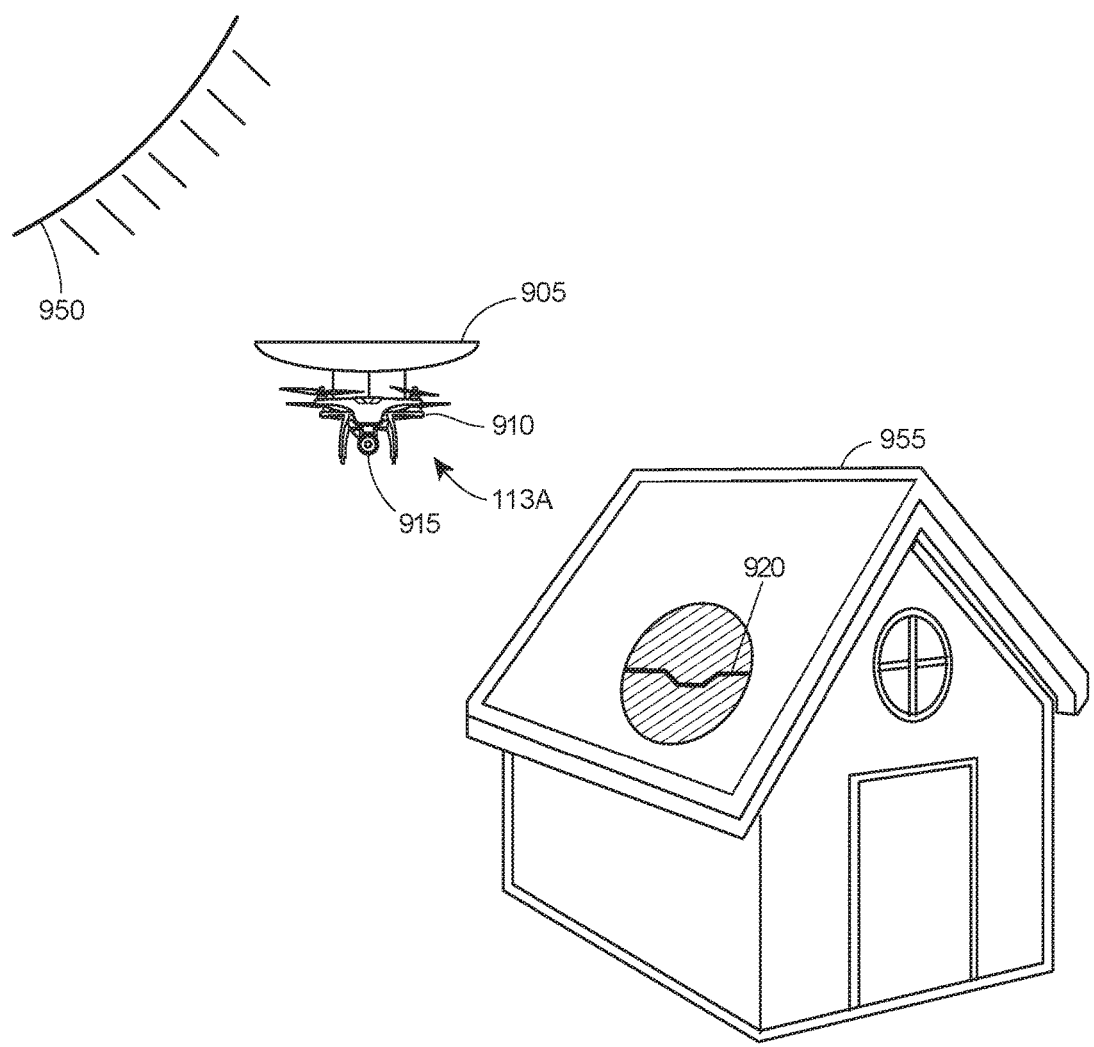
FIG. 9 illustrates an example shading system according to an embodiment.

FIGS. 9-12 illustrate example shading systems 113A-113D according to various embodiments. In particular, FIG. 9 illustrates an example shading system 113A according to an embodiment. The shading system 113A includes: a shading apparatus 905, a vehicle or device 910, and a 3D scanner 915.

The shading apparatus 905 may have a curved shaped, configured so that the concave side faces the sun 950. The device 910 may be autonomous or remotely controlled. In some instances, the device may be 910 may be referred to as a "drone." In example operation, the device 910 moves the shading apparatus 905 into a position between the sun 950 and the structure 955 to create the shaded region 920 on the structure 955. The 3D scanner 915 may then utilize light-based methods to scan the shaded region 920. For example, the 3D scanner 915 may utilize a time-of-flight technique relying on a projected laser dot, a laser line technique such as that shown in FIGS. 8A and 8B, and/or a projected light pattern technique. In some embodiments, the 3D scanner 915 may implement the method 600 shown in FIG. 6 and/or the method 700 shown in FIG. 7, in whole or in part.

In some embodiments, the shading apparatus 905 may have a different shape, size, or orientation. For example, in an embodiment, the convex side of the apparatus 905 may face the sun. In an embodiment, the apparatus 905 may be substantially flat in shape.

Figure 10:
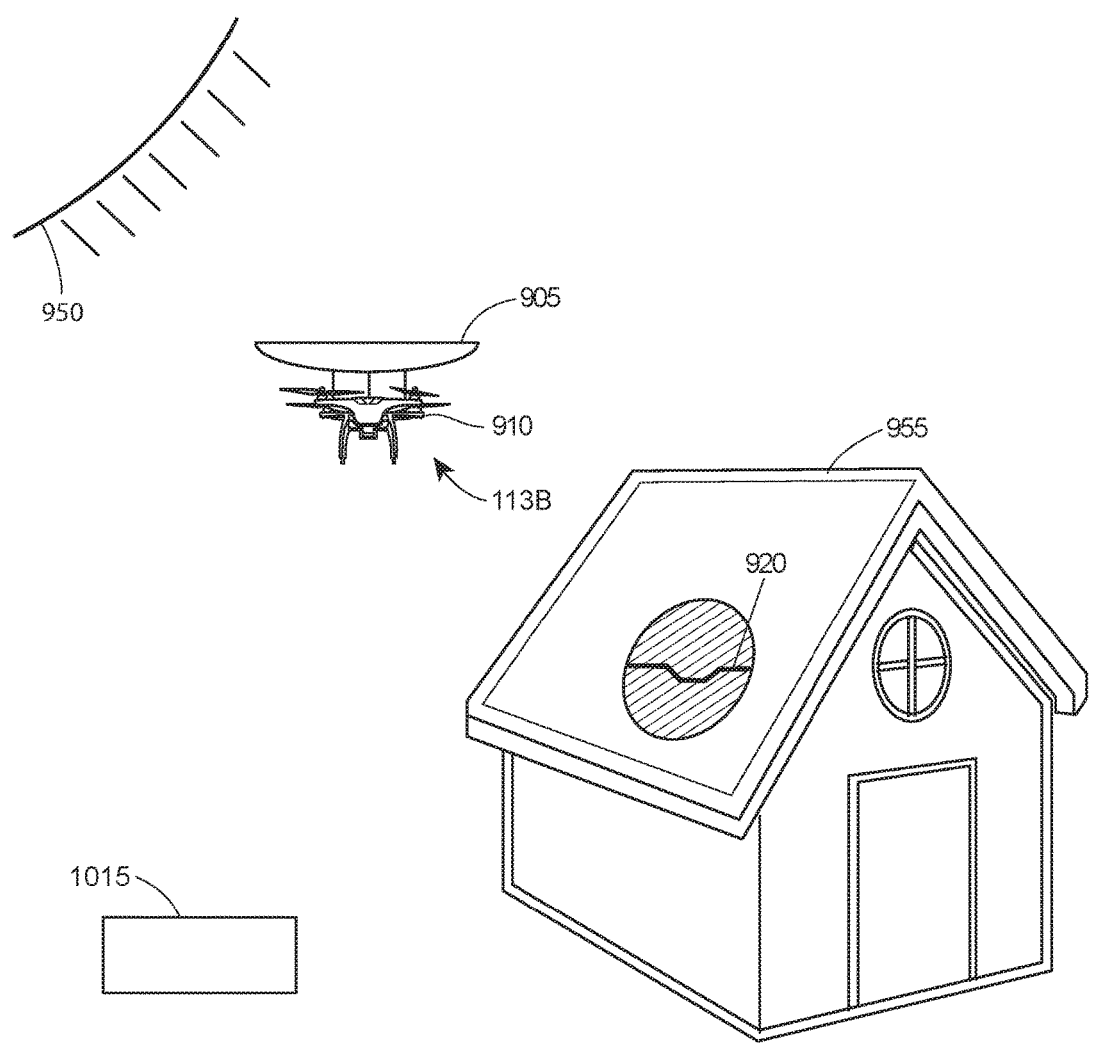
FIG. 10 illustrates an example shading system according to an embodiment.

FIG. 10 illustrates an example shading system 113B according to an embodiment. The shading system 113B includes the device 910 and the shading apparatus 905. Unlike the shading system 113A, the shading system 113B does not include the 3D scanner 915. Rather, a 3D scanner 1015, separate from the shading system 113B, scans the shaded region 920 of the roof 955. The 3D scanner 915 may be a stationary scanner, for example.

Figure 11:
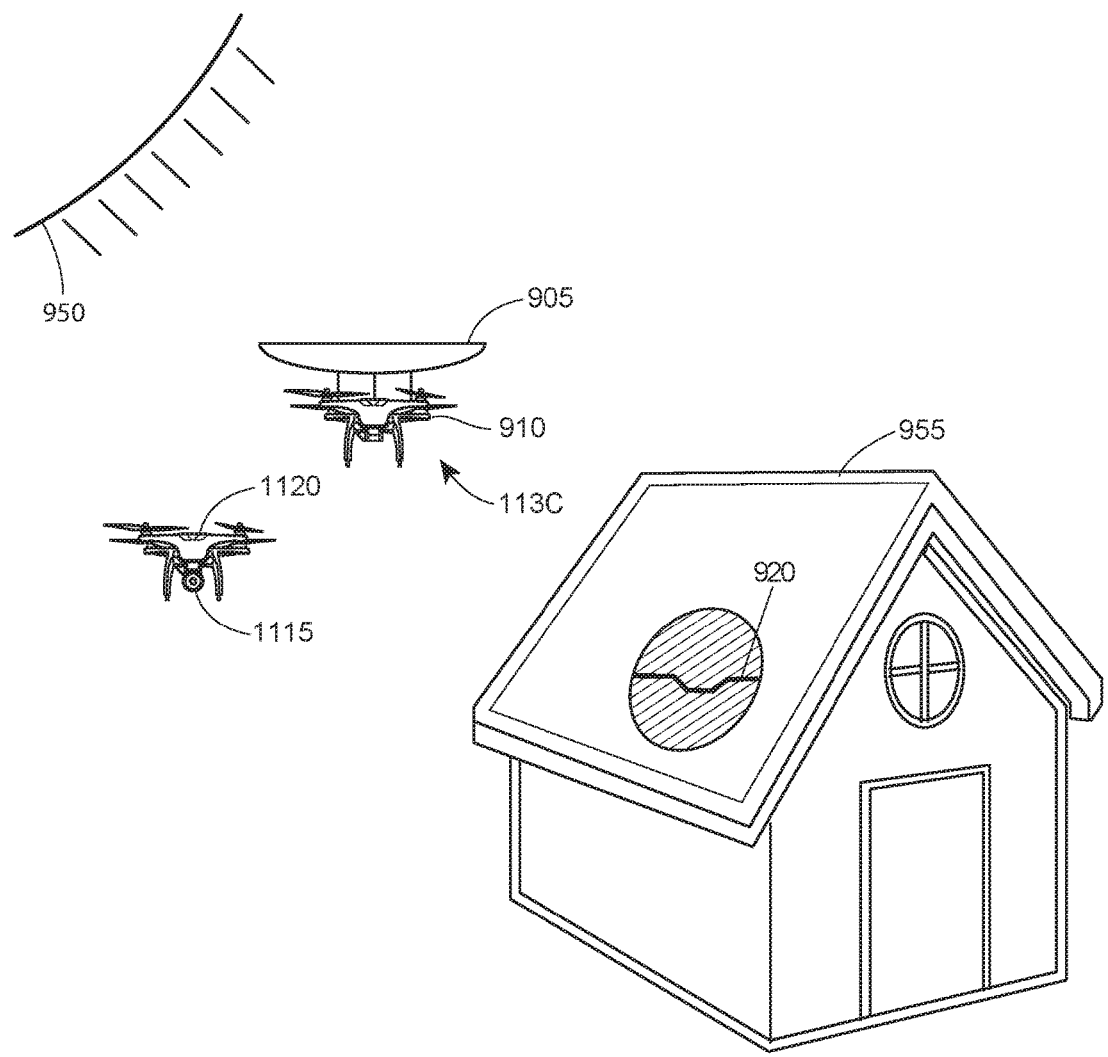
FIG. 11 illustrates an example shading system according to an embodiment.

FIG. 11 illustrates an example shading system 113C according to an embodiment. The shading system 113C includes the device 910 and the shading apparatus 905. A 3D scanner 1115, separate from the shading system 113C, scans the shaded region 920 of the roof 955. The 3D scanner 1115 may be a mobile scanner, for example. That is, the 3D scanner 1115 may include or be attached to a device or vehicle 1120, configured to move the 3D scanner 1115 into position so that the 3D scanner 1115 can scan the shaded region 920.

Figure 12:
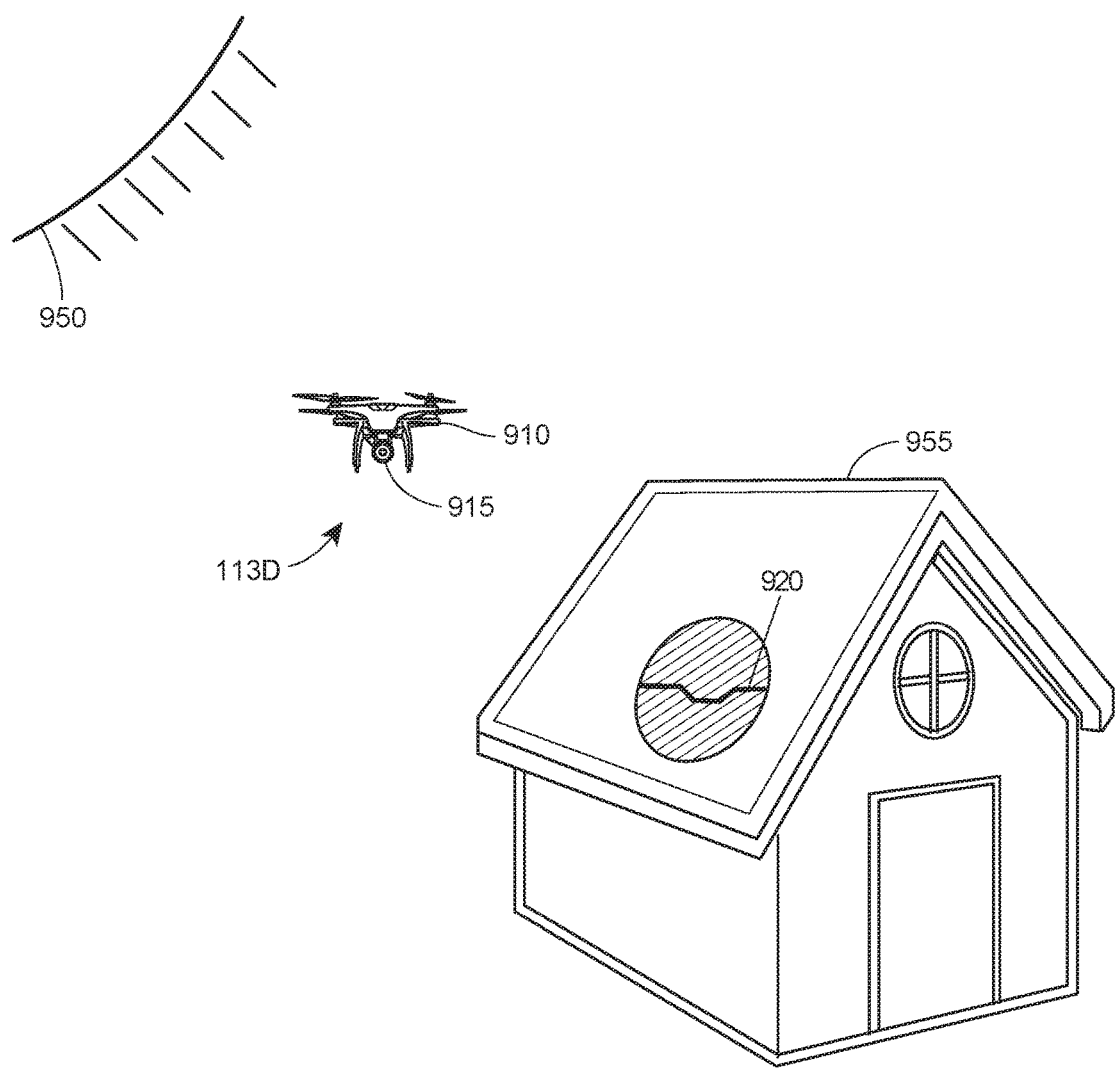
FIG. 12 illustrates an example shading system according to an embodiment.

FIG. 12 illustrates an example shading system 113D according to an embodiment. The shading system 113D includes the device 910 and the 3D scanner 915. The shading system 113D does not include the shading apparatus 905. Rather, the shading system 113D utilizes the body of the device 910 and/or the body of the 3D scanner 915 to create the shaded region 920.

IX. An Example Method for Generating a Model Using a Shading System

Figure 13:
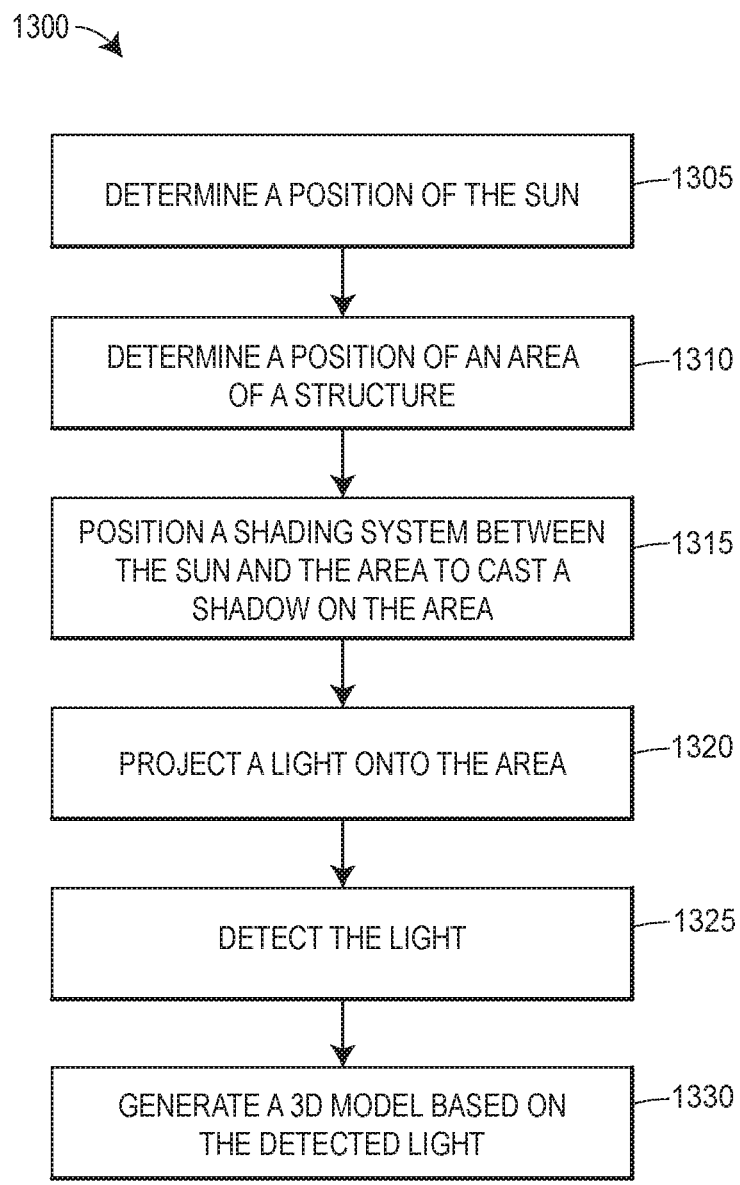
FIG. 13 illustrates a flow chart of an example method for generating a 3D model using a shading system according to an embodiment.

FIG. 13 illustrates a flow chart of an example method 1300 for generating a 3D model using a shading system according to an embodiment. The method may be implemented using a 3D scanner and shading system, such as one of the shading systems 113 or 113A-113D shown in FIGS. 1 and 9-12.

The method 1300 begins when a position of the sun is determined (block 1305) and a position of an area of a structure is determined (block 1310). In an embodiment, these determinations are made by the shading system itself. For example, the shading system may have light sensors to track the sun's position. In an embodiment, the shading system may have a memory storing data representing the sun's position. This data may be downloaded ahead of time or in real-time. The shading system may have a communication interface for downloading this data. In an embodiment, these determinations are made by a person remotely controlling the shading system via, for example, a radio controller.

The shading system is positioned between the sun and the area to cast a shadow on the area, creating a shaded region (block 1315). The shading system is moved by a device, such as the device 910 shown in FIGS. 9-12. The device 910 may be controlled by a control system, which may be a local control system installed on or within the device 910. In an embodiment, the control system may be a remote control system that wireless communicates with the device 910.

After the shaded region has been created, light can be projected onto an area within the shaded region (block 1320). As previously noted, the light may be a laser light or white light. The projected light may be a dot, a line, or a pattern.

After the light has been projected, the light is detected (block 1325). The light may be detected by a 3D scanner. The 3D scanner may be a part of the shading system. For example, the shading systems 113A and 113D shown in FIGS. 8 and 11 each include a 3D scanner. In an embodiment, the 3D scanner may be independent of the shading system. For example, the 3D scanners 106, 1015, and 1115 are independent from the shading systems 113, 113B, and 113C shown in FIGS. 1A, 9, and 10, respectively. The 3D scanner may include an image sensor for detecting the light, such as the image sensor 265 shown in FIG. 2.

After the light is detected, a 3D model is generated based on the detected light (block 1330). The 3D model may be stored to a memory, and may be analyzed to detect damage to the scanned structure.

In an embodiment, an example system includes one or more of: a first means for determining a position of the sun; a second means for determining a position of an area of the structure; a third means for actuating a propulsion system of a shading system to move the shading system to a position between the position of the sun and the position of the area so that the shading system casts a shadow on the area to create a shaded region; a fourth means for projecting a light within the shaded region, a fifth means for detecting the light, and/or a sixth means for generating a 3D model based on the detected light.

The first means for determining the position of the sun and/or the second means for determining the position of the area of the structure may include one or more of: the shading system 113 shown in FIGS. 1 and 4, the shading system 113A shown in FIG. 9, the shading system 113B shown in FIG. 10, the shading system 113C shown in FIG. 11, or the shading system 113D shown in FIG. 12. In an embodiment, the example system further includes a means for determining the sun's position relative to a shading system. This may include a means for determining the shading system's position and/or orientation.

The third means for actuating the propulsion system may include the vehicle 401 and/or the controller 403 shown in FIG. 4.

The fourth means for projecting light within the shaded region may include one or more of: the 3D scanner 106 shown in FIG. 1, the light projector 270 shown in FIG. 2, the 3D scanner 285 shown in FIG. 2, the 3D scanner 385 shown in FIG. 3, and/or any of the 3D scanners 915, 1015, or 1115 shown in FIGS. 9-12.

The fifth means for detecting the projected light may include any of the previously discussed 3D scanners. Similarly, the sixth means for generating a 3D model may include any of the previously discussed 3D scanners and/or data analysis systems.

In an embodiment, the example system may include a means for capturing at least two 2D images. The 2D images may be captured from different angles. In an embodiment, the sixth means for generating the 3D model may include a means for generating a 3D model by utilizing photogrammetry to stitch the 2D images together to form the 3D model.

In an embodiment, the fifth means for detecting the projected light may include a means for detecting a deformation in the projected light.

In an embodiment, the fourth means for projecting the light comprises a means for projecting a laser line; a means for projecting a patterned white light; and/or a means for projecting a laser dot.

In an embodiment, the fifth means for detecting the light comprises: (i) a means for detecting the laser dot and measuring a time-of-flight for the laser dot; and/or (ii) a means for detecting the laser dot and measuring a phase shift for the laser dot.

In an embodiment, the first means for determining the position of the sun includes: a means for detecting a current time from a clock (e.g., a hardware clock and/or a software clock); a means for accessing a memory storing sun data representing a plurality of positions in the sky for the sun, each of the plurality of positions in the sky corresponding to a particular time (e.g., the memory 414 of the controller 403); a means for identifying from the sun data a position in the sky corresponding to the current time (e.g., the processor 412 and memory 414—storing sun data—of the controller 403); and a means for determining the position of the sun based on the position in the sky identified from the sun data (e.g., the processor 412 and memory 414 of the controller 403).

In an embodiment, the example system includes a means (e.g., the controller 403) for determining a current orientation and a current position of the shading system. In an embodiment, the example system includes a means (e.g., the controller 403) for determining a distance and a direction that the shading system needs to be moved based on: (a) the current orientation and current position of the means for providing shade, (b) the position of the sun, and (c) the position of the area. In an embodiment, the propulsion system is actuated based on based on the determined distance and direction that the shading system needs to be moved.

In an embodiment, the shading apparatus is physically connected to a light projector, and the fourth means for projecting the light includes the light projector.

In an embodiment, the shading apparatus is physically connected to a 3D scanner, and the fifth means for detecting the light includes the 3D scanner.

X. Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described as including logic or a number of routines, subroutines, applications, or instructions. These embodiments may constitute either software (e.g., code embodied on a machine-readable medium) and/or hardware, depending on the context. In example embodiments, one or more computer systems (e.g., a standalone client or server computer system) or one or more hardware systems/subsystems of a computer system (e.g., a processor or a group of processors) may be configured by software (e.g., an application or application portion) as a hardware system that operates to perform certain of the described operations.

A hardware system may be implemented in dedicated and permanently configured circuitry, or in temporarily configured circuitry (e.g., configured by software). That is, a hardware system may comprise dedicated circuitry or logic that is permanently configured (e.g., as a special-purpose processor, such as a field programmable gate array (FPGA) or an application-specific integrated circuit (ASIC) to perform certain operations). Further, a hardware system may also comprise programmable logic or circuitry (e.g., as encompassed within a general-purpose processor or other programmable processor) that is temporarily configured by software to perform certain operations.

As used herein and unless otherwise specified, when used in the context of system(s) or device(s) that communicate information or data, the term "network" refers to a collection of nodes (e.g., devices or systems capable of sending, receiving and/or forwarding information) and links which are connected so as to enable telecommunication between the nodes.

Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary device that receive and forward the message (e.g., between two end-devices) are also generally considered to be "nodes."

A "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals sometimes may be transmitted via the same band by allocating time slots over which respective transmitters and receivers use the band in question.

As already noted, a network is a collection of nodes and links. A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a personal area network (PAN), local area network (LAN), and/or a wide area network (WAN). Each of these may be wired or wireless networks. For example, Bluetooth technology may be used to connect to or establish a wireless PAN, and a USB interface may be used to establish or connect to a wired PAN. An example WAN is the Internet.

Some of the described devices and/or systems include a "communication interface" (sometimes referred to as a "network interface" or a "peripheral interface"). A communication interface of a system enables the system to send information or data to other system and/or receive information/data from other systems. In some instances, a communication interface of a system may be utilized to establish a direct connection to another system. In some instances, a communication interface of a system enables the system to connect to a network (via a link).

To illustrate, a communication interface can include circuitry for wireless or wired communication with one or more devices or systems using any suitable communications protocol. Wireless communication may be short-range and/or long-range. For example, a communication interface may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/1P") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. One or more of these protocols may be utilized to connect to a PAN, LAN, and/or WAN. A communication interface of a system may also include circuitry that enables the system to be electrically or optically coupled to another device (e.g., via a coax cable or fiber optic cable) and to communicate with that other device.

The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller and/or an I/O controller. A chipset is a collection of electronic components in an integrated circuit that is typically configured to provide I/O and memory management functions as well as a plurality of general purpose and/or special purpose registers, timers, etc. Generally speaking, one or more of the described processors may be communicatively coupled to other components (such as memory devices and I/O devices) via a system bus.

The performance of certain operations may be distributed among one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Generally speaking, as used herein the phrase "memory" or "memory device" refers to a system or device including computer-readable media ("CRM"). "CRM" refers to a medium or media accessible by the relevant computing system for placing, keeping, and/or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Generally speaking, a processor or a particular system or subsystem may communicate with other components of the system or subsystem via one or more communication links. When communicating with components in a shared housing, for example, the processor may be communicatively connected to components by a system bus. Unless stated otherwise, as used herein the phrase "system bus" refers to: a data bus (for carrying data), an address bus (for determining where the data should be sent), a control bus (for determining the operation to execute), or some combination thereof. Further, "system bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of the implementations herein. This description should be read to include one or at least one.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method comprising:
   determining, by a controller of a shading system, a position of the sun, wherein the determining includes:
   (i) detecting a current time from a clock;
   (ii) accessing a memory storing sun data representing a plurality of positions in the sky for the sun, each of the plurality of positions in the sky corresponding to a particular time;
   (iii) identifying from the sun data a position in the sky corresponding to the current time; and
   (iv) determining, by the controller, the position of the sun based on the position in the sky identified from the sun data;
   determining, by the controller, a position of an area of a structure;
   causing the controller to actuate a propulsion system of the shading system to move the shading system to a position between the position of the sun and the position of the area so that the shading system casts a shadow on the area to create a shaded region;
   projecting, by a light projector, a light within the shaded region;
   detecting, by a three-dimensional (3D) scanner, the light; and
   generating, by the 3D scanner, a 3D model of at least part of the structure based on the detected light.

2. The method of claim 1, wherein detecting the light comprises capturing at least two two-dimensional (2D) images, each of the at least two 2D images captured from a different angle;
   wherein generating the 3D model based on the detected light comprises: generating the 3D model by utilizing photogrammetry to stitch the at least two 2D images together to form the 3D model.

3. The method of claim 1, wherein detecting the light includes detecting a deformation in the projected light.

4. The method of claim 1, wherein projecting the light within the shaded region comprises projecting a laser line or a patterned white light.

5. The method of claim 1, wherein projecting the light within the shaded region comprises projecting a laser dot.

6. The method of claim 5, wherein detecting the light comprises: (i) detecting the laser dot and measuring a time-of-flight for the laser dot; or (ii) detecting the laser dot and measuring a phase shift for the laser dot.

7. The method of claim 1, further comprising:

determining, by the controller, a current orientation and a current position of the shading system; and determining, by the controller, a distance and a direction that the shading system needs to be moved based on: (a) the determined current orientation and current position of the means for providing shade, (b) the position of the sun, and (c) the position of the area;

wherein causing the controller to actuate the propulsion system includes actuating the propulsion system based on the determined distance and direction that the shading system needs to be moved.

8. A shading system comprising:

(A) a means for providing shade;

(B) a propulsion system configured to move the means for providing shade;

(C) a memory storing sun data representing a plurality of positions in the sky for the sun, each of the plurality of positions in the sky corresponding to a particular time;

(D) a controller configured to actuate the propulsion system to move the means for providing shade to a particular position between the position of the sun and the position of the area so that the means for providing shade casts a shadow on the area to create a shaded region wherein the controller is further configured to:

(i) detect a current time utilizing a clock;

(ii) identify from the sun data a position in the sky corresponding to the current time; and (iii) determine the position of the sun based on the position in the sky identified from the sun data; and (E) a 3D scanner configured to: detect light projected within the shaded region and generate a 3D model of at least part of the structure based on the detected light.

9. The system of claim 8, further comprising a light sensor;

wherein controller is further configured to determine the position of the sun based on light from the sun that is detected by the light sensor.

10. The shading system of claim 8, further comprising one or more movement/position sensors communicatively connected to the controller, wherein the controller is further configured to:

(i) determine a current orientation and a current position of the means for providing shade;

(ii) determine a distance and direction that the means for providing shade needs to be moved based on: (a) the determined current orientation and current position of the means for providing shade, (b) the position of the sun, and (c) the position of the area; and (iii) actuate the propulsion system based on the determined distance and direction that the means for providing shade needs to be moved.

11. The system of claim 8, further comprising a light projector configured to project the light detected by the 3D scanner.

12. The system of claim 8, wherein the 3D scanner is directly or indirectly physically connected to the means for providing shade so that when the propulsion system moves the means for providing shade, the propulsion system also moves the 3D scanner.

13. The system of claim 8, further comprising a coordinator configured to activate the 3D scanner to detect the light when the means for providing shade moves to the position between the position of the sun and the position of the area.

14. A shading system comprising:

(A) a shading apparatus;

(B) a memory storing sun data representing a plurality of positions in the sky for the sun, each of the plurality of positions in the sky corresponding to a particular time;

(C) a device physically connected to the shading apparatus, the device including:

(i) a propulsion system that generates thrust;

(ii) a controller configured to:

(a) determine a position of the sun by: detecting a current time utilizing a clock, identifying from the sun data a position in the sky corresponding to the current time, and determining the position of the sun based on the position in the sky identified from the sun data;

(b) determine a position of an area of a structure;

(c) determine a particular position where the shading apparatus will cast a shadow on the area of the structure by: identifying a position between the position of the sun and the position of the area of the structure; and (d) actuate the propulsion system to move the device to the particular position where the shading apparatus will cast the shadow on the area of the structure to create a shaded region; and (D) a 3D scanner configured to detect a light projected within the shaded region and to generate a 3D model of at least part of the structure based on the detected light.

15. The shading system of claim 14, wherein the 3D scanner includes a light projector configured to project a light within the shaded region.

16. The shading system of claim 14, wherein the shading apparatus has a curved shape and is configured so that a concave side of the shading apparatus is facing the sun.

* * * * *

UNITED STATES PATENT AND TRADEMARK OFFICE
CERTIFICATE OF CORRECTION

PATENT NO.         : 10,176,527 B1
APPLICATION NO.    : 15/140226
DATED              : January 8, 2019
INVENTOR(S)        : James M. Freeman et al.

It is certified that error appears in the above-identified patent and that said Letters Patent is hereby corrected as shown below:

In the Claims

At Column 25, Line 26, in Claim 8, "region wherein" should be -- region, wherein --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*